(12) United States Patent
Tsujita

(10) Patent No.: US 11,973,920 B2
(45) Date of Patent: Apr. 30, 2024

(54) IMAGE FORMING APPARATUS WITH PER-PAGE MANAGEMENT OF TONE CORRECTION PATCHES AND METHOD THEREOF

(71) Applicant: CANON KABUSHIKI KAISHA, Tokyo (JP)

(72) Inventor: Kosuke Tsujita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 51 days.

(21) Appl. No.: 17/500,719

(22) Filed: Oct. 13, 2021

(65) Prior Publication Data
US 2022/0141355 A1 May 5, 2022

(30) Foreign Application Priority Data
Nov. 2, 2020 (JP) .................................. 2020-183810

(51) Int. Cl.
*H04N 1/60* (2006.01)

(52) U.S. Cl.
CPC ......... *H04N 1/6097* (2013.01); *H04N 1/6033* (2013.01); *H04N 1/6036* (2013.01); *H04N 1/6047* (2013.01)

(58) Field of Classification Search
CPC .. H04N 1/6033; H04N 1/6097; H04N 1/6036; H04N 1/6047
See application file for complete search history.

(56) References Cited

U.S. PATENT DOCUMENTS

| 4,852,485 | A  | * | 8/1989  | Brunner .............. | B41F 33/0045 |
|           |    |   |         |                       | 101/DIG. 45  |
| 10,506,133 | B2 | * | 12/2019 | Nakahara ............. | H04N 1/6008 |
| 2005/0275854 | A1 | * | 12/2005 | Bailey .................. | G06K 15/025 |
|           |    |   |         |                       | 358/1.9 |
| 2006/0066882 | A1 | * | 3/2006 | Yamauchi ............ | H04N 1/6033 |
|           |    |   |         |                       | 358/1.9 |
| 2006/0152776 | A1 | * | 7/2006 | Bailey .................. | H04N 1/6055 |
|           |    |   |         |                       | 358/504 |
| 2017/0094125 | A1 |   | 3/2017 | Yamamoto ........... | H04N 1/6027 |
| 2019/0268502 | A1 | * | 8/2019 | Shirasawa ............ | H04N 1/6027 |
| 2022/0263972 | A1 | * | 8/2022 | Kaima ................. | H04N 1/6033 |

FOREIGN PATENT DOCUMENTS

JP          6422923  B2      11/2018

* cited by examiner

*Primary Examiner* — Barbara D Reinier
(74) *Attorney, Agent, or Firm* — Venable LLP

(57) ABSTRACT

An image forming apparatus including an image forming unit is provided. The apparatus determines a color of a tone patch for tone correction, to be composited with an image, in accordance with a color component used in the image; generates a patch-included image by compositing the tone patch of the color determined with the image; generates a corrected image by performing tone correction on the patch-included image on the basis of tone correction information for each color component; performs color measurement of the tone patch formed on the medium on which the corrected image has been formed, and updates the tone correction information on the basis of a value measured.

9 Claims, 24 Drawing Sheets

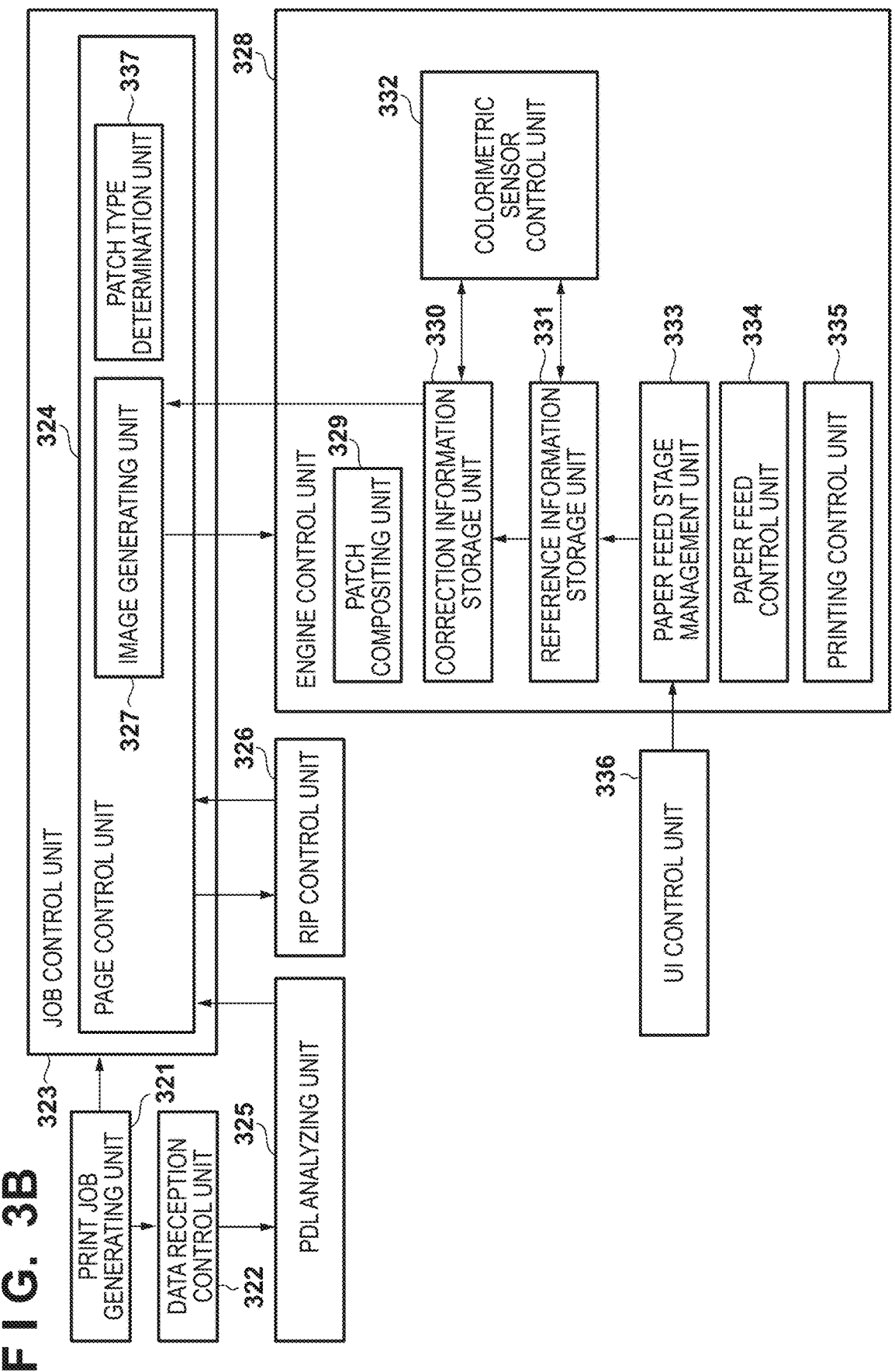

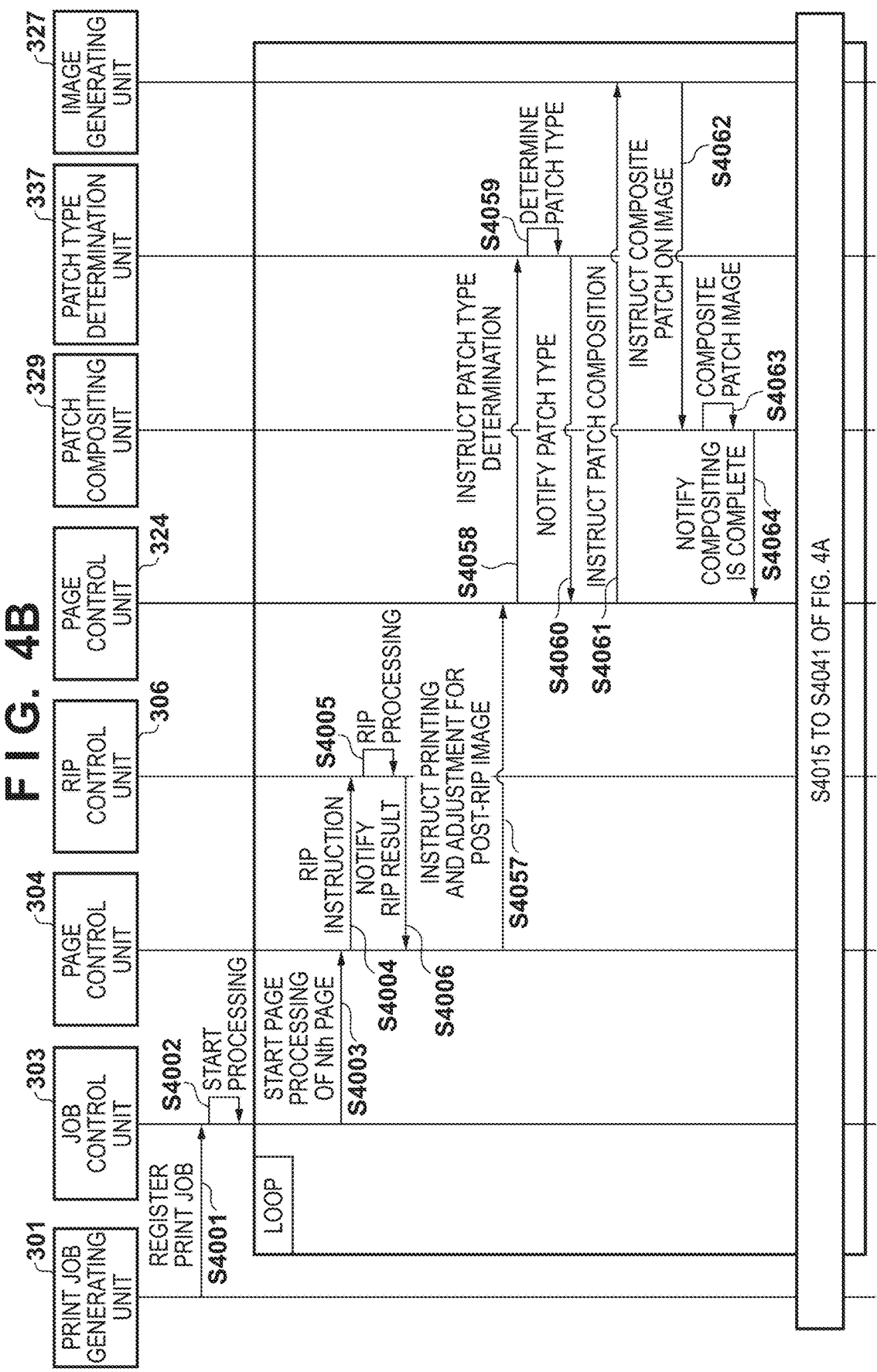

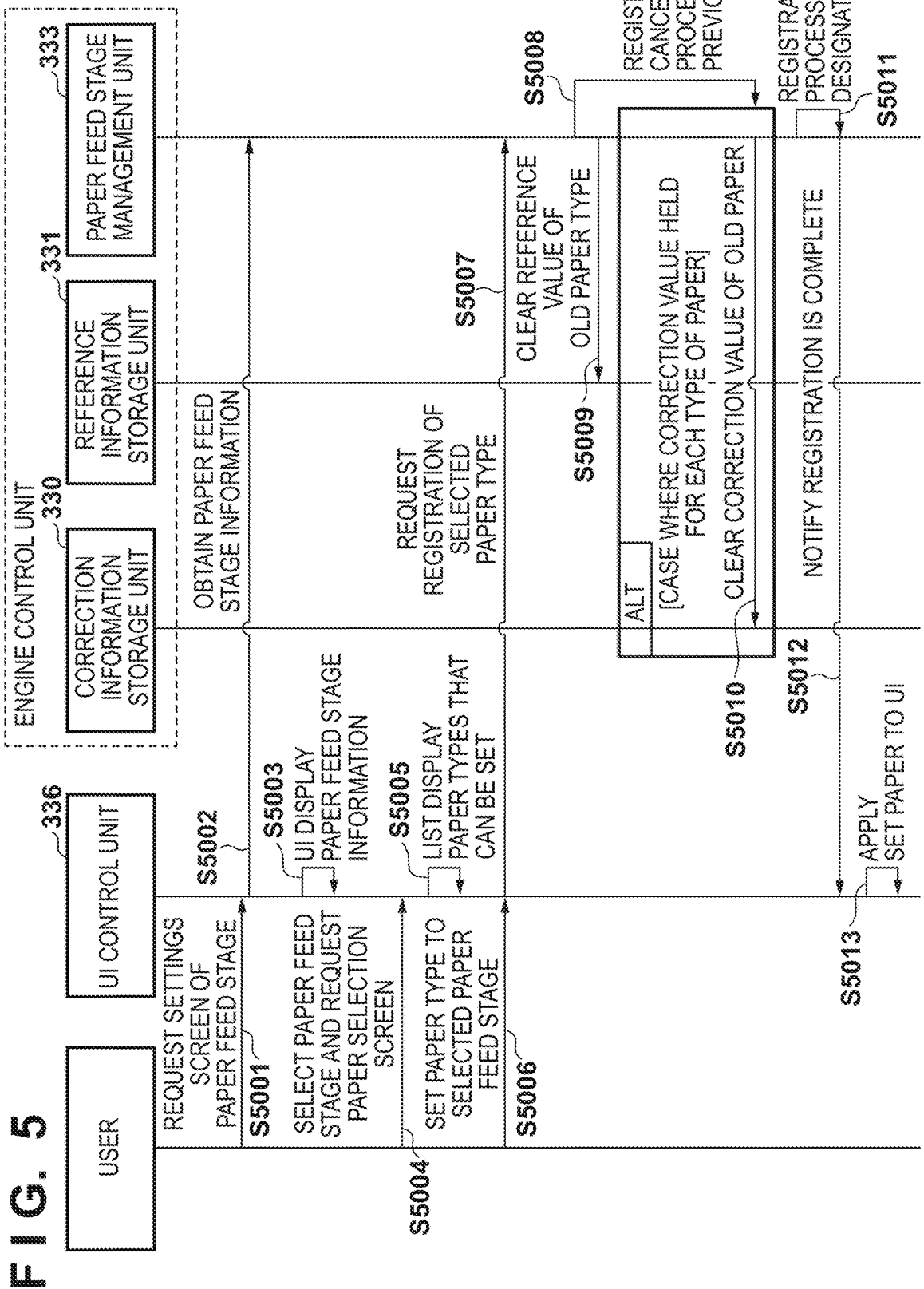

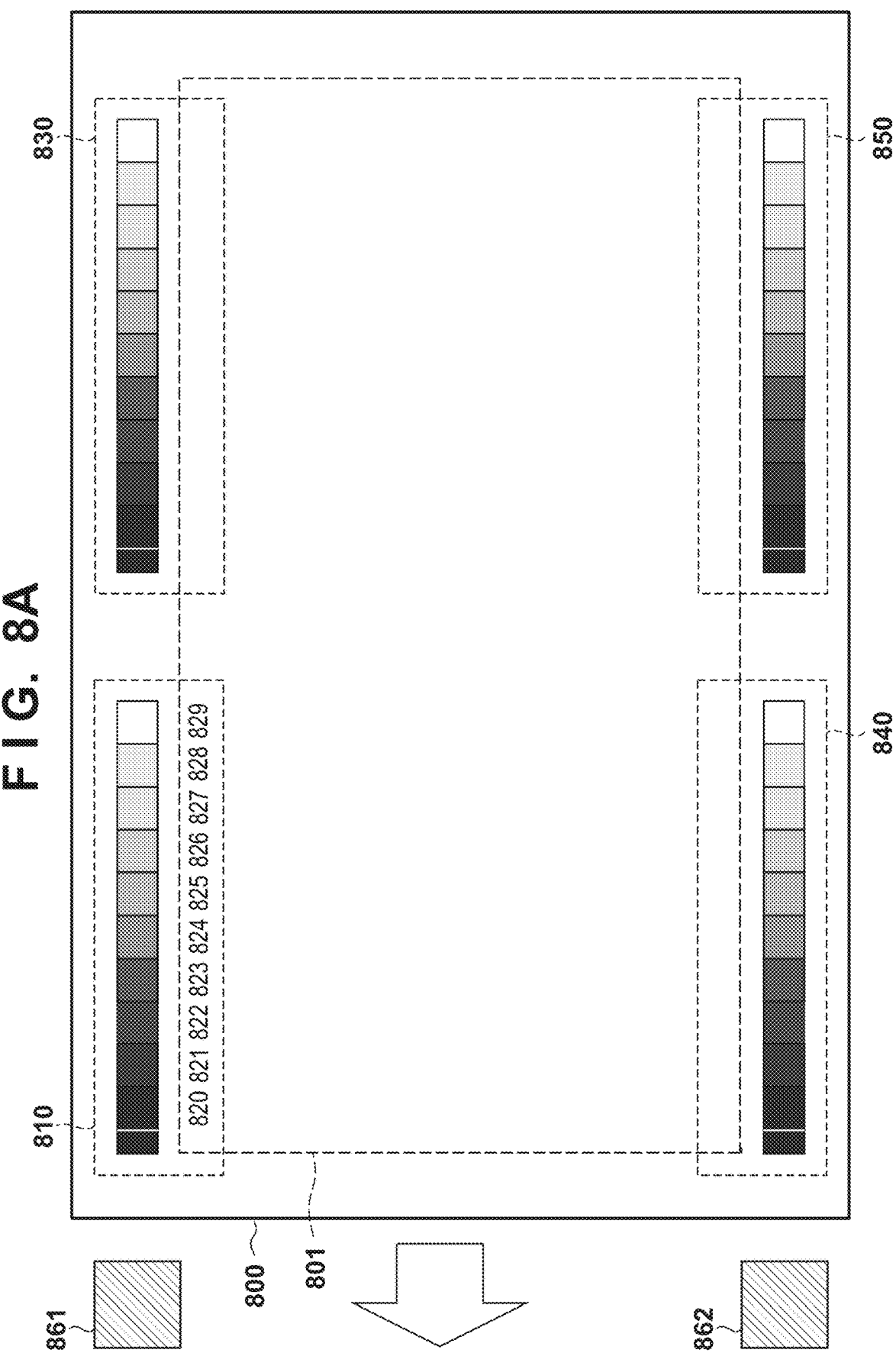

REFERENCE VALUE

| DENSITY | 100 | 90 | 80 | 70 | 60 | 50 | 40 | 30 | 20 | 10 |
|---|---|---|---|---|---|---|---|---|---|---|
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

881A

MEASUREMENT VALUE

| DENSITY | 100 | 90 | 80 | 70 | 60 | 50 | 40 | 30 | 20 | 10 |
|---|---|---|---|---|---|---|---|---|---|---|
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 820 | 700 | 601 | 512 | 405 | 302 | 205 | 95 |

882A

CORRECTION VALUE

| DENSITY | 100 | 90 | 80 | 70 | 60 | 50 | 40 | 30 | 20 | 10 |
|---|---|---|---|---|---|---|---|---|---|---|
| C | 4 | 1 | 3 | -2 | -3 | -8 | 4 | 0 | 20 | 2 |
| M | 10 | 3 | 5 | -6 | 0 | -10 | -10 | -2 | 2 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

| PAPER TYPE | TARGET PAPER FEED STAGE | REFERENCE VALUE (1/2 SPEED) | REFERENCE VALUE (1/1 SPEED) | GENERATION PageID | Timestamp |
|---|---|---|---|---|---|
| STANDARD PAPER 3 | CST1 | NULL | EXISTING TBL 881 | 60014 | 2019/07/18 10:04:06 |
| COATED PAPER 1 | CST4 | NULL | NULL | NULL | NULL |

FIG. 8D2

| PAPER TYPE | TARGET PAPER FEED STAGE | REFERENCE VALUE (1/2 SPEED) | REFERENCE VALUE (1/1 SPEED) | GENERATION PageID | Timestamp |
|---|---|---|---|---|---|
| STANDARD PAPER 3 | CST1 | NULL | EXISTING TBL 883 | 640015 | 2019/07/18 18:34:21 |
| COATED PAPER 1 | CST4 | NULL | NULL | NULL | NULL |

FIG. 8E1

REFERENCE VALUE

881B

| DENSITY | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|
| C | 102 | 153 | 209 | 252 | 301 | 349 | 401 | 453 | 502 | 560 | 605 | 660 | 700 | 755 | 804 | 851 | 902 | 965 | 998 | 1022 |
| M | 99 | 149 | 201 | 249 | 299 | 350 | 398 | 450 | 499 | 551 | 599 | 659 | 699 | 751 | 801 | 855 |  | 950 | 988 | 1020 |
| Y | 100 | 155 | 201 | 255 | 299 | 350 | 399 | 455 | 501 | 555 | 601 | 655 | 698 | 752 | 800 | 855 | 903 | 966 | 980 | 1023 |
| K | 95 | 149 | 201 | 244 | 300 | 350 | 404 | 444 | 501 | 555 | 595 | 661 | 695 | 754 | 802 | 855 | 901 | 955 | 999 | 1023 |

FIG. 8E2

MEASUREMENT VALUE

882B

| DENSITY | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|
| C | 105 | 159 | 214 | 252 | 301 | 347 | 408 | 456 | 496 | 556 | 603 | 655 | 699 | 754 | 801 | 843 | 912 | 965 | 993 | 1020 |
| M | 97 | 145 | 206 | 250 | 298 | 348 | 393 | 451 | 498 | 551 | 593 | 657 | 696 | 754 | 805 | 855 | 900 | 955 | 992 | 1023 |
| Y | 100 | 155 | 206 | 258 | 298 | 350 | 393 | 450 | 505 | 559 | 698 | 653 | 697 | 752 | 799 | 863 | 904 | 971 | 979 | 1023 |
| K | 94 | 153 | 202 | 244 | 292 | 345 | 401 | 446 | 502 | 555 | 601 | 653 | 693 | 751 | 802 | 860 | 905 | 956 | 999 | 1022 |

FIG. 8E3

CORRECTION VALUE

883B

| DENSITY | 5 | 10 | 15 | 20 | 25 | 30 | 35 | 40 | 45 | 50 | 55 | 60 | 65 | 70 | 75 | 80 | 85 | 90 | 95 | 100 |
|---|---|---|---|---|---|---|---|---|---|---|---|---|---|---|---|---|---|---|---|---|
| C | -3 | -6 | -5 | 0 | 0 | 2 | 3 | -3 | 6 | 4 | 2 | 5 | 1 | -7 | 3 | 8 | -10 | 0 | 5 | 2 |
| M | 2 | 4 | -5 | -1 | 1 | 2 | 5 | -1 | 1 | 0 | 6 | 2 | 3 | -3 | -4 | 0 | 3 | -5 | -4 | 0 |
| Y | 0 | 0 | -5 | -3 | 8 | 0 | 6 | 5 | -4 | -4 | 3 | 2 | 1 | 0 | 1 | -8 | 9 | -5 | 1 | 0 |
| K | 1 | -4 | -1 | 0 | 8 | 5 | 3 | -2 | -1 | 0 | -6 | 8 | 2 | 3 | 0 | -5 | -4 | -1 | 0 | 1 |

FIG. 8F1

881C — REFERENCE VALUE

| DENSITY | 3 | 6 | 9 | 12 | 15 | 18 | 21 | 24 | 27 | 31 | 34 | 37 | 40 | 43 | 46 | 49 | 52 | 55 | 58 | 62 | 66 | 70 | 74 | 78 | 80 | 84 | 88 | 92 | 96 | 100 |
|---|---|---|---|---|---|---|---|---|---|---|---|---|---|---|---|---|---|---|---|---|---|---|---|---|---|---|---|---|---|---|
| C | 102 | 131 | 165 | 220 | 251 | 282 | 310 | 349 | 381 | 402 | 430 | 460 | 491 | 519 | 551 | 581 | 610 | 640 | 670 | 701 | 730 | 760 | 800 | 827 | 860 | 890 | 927 | 960 | 999 | 1022 |
| M | 108 | 141 | 170 | 218 | 248 | 280 | 311 | 344 | 379 | 395 | 433 | 461 | 489 | 522 | 552 | 577 | 608 | 641 | 666 | 698 | 729 | 759 | 799 | 825 | 862 | 891 | 920 | 959 | 989 | 1020 |
| Y | 111 | 144 | 171 | 221 | 255 | 280 | 305 | 346 | 375 | 400 | 425 | 455 | 489 | 520 | 555 | 580 | 606 | 639 | 667 | 700 | 731 | 759 | 798 | 822 | 859 | 888 | 920 | 957 | 987 | 1016 |
| K | 112 | 149 | 180 | 220 | 249 | 282 | 311 | 350 | 380 | 401 | 430 | 459 | 490 | 521 | 550 | 582 | 609 | 639 | 667 | 699 | 729 | 762 | 795 | 822 | 859 | 890 | 927 | 957 | 987 | 1023 |

FIG. 8F2

882C — MEASUREMENT VALUE

| DENSITY | 3 | 6 | 9 | 12 | 15 | 18 | 21 | 24 | 27 | 31 | 34 | 37 | 40 | 43 | 46 | 49 | 52 | 55 | 58 | 62 | 66 | 70 | 74 | 78 | 80 | 84 | 88 | 92 | 96 | 100 |
|---|---|---|---|---|---|---|---|---|---|---|---|---|---|---|---|---|---|---|---|---|---|---|---|---|---|---|---|---|---|---|
| C | 100 | 126 | 164 | 227 | 248 | 274 | 320 | 349 | 376 | 400 | 433 | 466 | 496 | 519 | 551 | 579 | 607 | 643 | 664 | 697 | 728 | 755 | 799 | 834 | 857 | 882 | 937 | 960 | 994 | 1020 |
| M | 102 | 138 | 167 | 221 | 252 | 280 | 308 | 345 | 383 | 395 | 431 | 457 | 494 | 523 | 551 | 575 | 603 | 642 | 665 | 698 | 723 | 757 | 802 | 829 | 866 | 891 | 917 | 964 | 993 | 1020 |
| Y | 108 | 142 | 170 | 221 | 254 | 288 | 296 | 351 | 374 | 400 | 425 | 455 | 494 | 523 | 554 | 580 | 600 | 634 | 671 | 704 | 728 | 757 | 797 | 822 | 858 | 896 | 911 | 962 | 986 | 1016 |
| K | 118 | 157 | 182 | 223 | 223 | 287 | 315 | 351 | 380 | 400 | 429 | 463 | 491 | 521 | 542 | 587 | 612 | 641 | 668 | 699 | 735 | 754 | 793 | 819 | 964 | 895 | 931 | 958 | 987 | 1022 |

FIG. 8F3

883C — CORRECTION VALUE

| DENSITY | 3 | 6 | 9 | 12 | 15 | 18 | 21 | 24 | 27 | 31 | 34 | 37 | 40 | 43 | 46 | 49 | 52 | 55 | 58 | 62 | 66 | 70 | 74 | 78 | 80 | 84 | 88 | 92 | 96 | 100 |
|---|---|---|---|---|---|---|---|---|---|---|---|---|---|---|---|---|---|---|---|---|---|---|---|---|---|---|---|---|---|---|
| C | 2 | 5 | 1 | −7 | 3 | 8 | −10 | 0 | 5 | 2 | −3 | −6 | −5 | 0 | 0 | 2 | 3 | −3 | 6 | 4 | 2 | 5 | 1 | −7 | 3 | 8 | −10 | 0 | 5 | 2 |
| M | 6 | 3 | 3 | −3 | −4 | 0 | 3 | −1 | −4 | 0 | 2 | 4 | −5 | −1 | 1 | 2 | 5 | −1 | 1 | 0 | 6 | 2 | −3 | −4 | −4 | 0 | 3 | −5 | −4 | 0 |
| Y | 2 | 2 | 1 | 0 | 1 | −8 | 9 | −5 | 1 | 0 | 0 | 0 | −5 | −3 | 1 | 0 | 6 | 5 | −4 | −4 | 3 | 2 | 1 | 0 | 1 | −8 | 9 | −5 | 1 | 0 |
| K | −6 | 8 | 2 | 3 | 0 | −5 | −4 | −1 | 0 | 1 | 1 | −4 | −1 | 0 | 8 | 5 | 3 | −2 | −1 | 0 | −6 | 8 | 2 | 3 | −5 | −5 | −4 | −1 | 0 | 1 |

FIG. 8G1 — REFERENCE VALUE (881D)

| DENSITY | 100 | 97 | 93 | 90 | 87 | 84 | 81 | 78 | 75 | 72 | 69 | 66 | 63 | 60 | 57 | 54 | 51 | 48 | 37 | 34 | 31 | 27 | 24 | 21 | 18 | 30 | 28 | 26 | 24 | 22 | 20 | 18 | 16 | 14 | 12 | 10 | 8 | 6 | 4 | 2 |
|---|---|---|---|---|---|---|---|---|---|---|---|---|---|---|---|---|---|---|---|---|---|---|---|---|---|---|---|---|---|---|---|---|---|---|---|---|---|---|---|---|
| C | 1022 | 999 | 976 | 943 | 920 | 897 | 874 | 853 | 830 | 807 | 784 | 761 | 738 | 715 | 693 | 660 | 638 | 615 | 592 | 569 | 546 | 524 | 501 | 470 | 448 | 425 | 401 | 370 | 345 | 322 | 299 | 276 | 240 | 211 | 181 | 154 | 140 | 131 | 122 | 102 |
| M | 1020 | 998 | 971 | 940 | 910 | 899 | 871 | 850 | 829 | 801 | 790 | 760 | 729 | 717 | 691 | 659 | 633 | 612 | 590 | 563 | 545 | 521 | 499 | 469 | 441 | 422 | 399 | 369 | 344 | 321 | 298 | 277 | 239 | 205 | 188 | 160 | 139 | 135 | 115 | 103 |
| Y | 1022 | 997 | 976 | 943 | 920 | 897 | 874 | 853 | 830 | 807 | 784 | 761 | 738 | 715 | 693 | 660 | 638 | 615 | 592 | 569 | 546 | 524 | 501 | 470 | 448 | 425 | 401 | 370 | 345 | 322 | 299 | 276 | 240 | 211 | 181 | 154 | 140 | 131 | 122 | 102 |
| K | 1020 | 995 | 971 | 940 | 910 | 899 | 871 | 850 | 829 | 801 | 790 | 760 | 729 | 717 | 691 | 659 | 633 | 612 | 590 | 563 | 545 | 521 | 499 | 469 | 441 | 422 | 399 | 369 | 344 | 321 | 298 | 277 | 239 | 205 | 188 | 160 | 139 | 135 | 115 | 103 |

FIG. 8G2 — MEASUREMENT VALUE (882D)

| DENSITY | 100 | 97 | 93 | 90 | 87 | 84 | 81 | 78 | 75 | 72 | 69 | 66 | 63 | 60 | 57 | 54 | 51 | 48 | 37 | 34 | 31 | 27 | 24 | 21 | 18 | 30 | 28 | 26 | 24 | 22 | 20 | 18 | 16 | 14 | 12 | 10 | 8 | 6 | 4 | 2 |
|---|---|---|---|---|---|---|---|---|---|---|---|---|---|---|---|---|---|---|---|---|---|---|---|---|---|---|---|---|---|---|---|---|---|---|---|---|---|---|---|---|
| C | 1017 | 999 | 979 | 935 | 917 | 904 | 881 | 852 | 825 | 812 | 778 | 764 | 736 | 719 | 693 | 661 | 630 | 607 | 599 | 568 | 541 | 522 | 496 | 470 | 451 | 418 | 398 | 363 | 344 | 317 | 294 | 276 | 235 | 203 | 178 | 161 | 141 | 136 | 124 | 97 |
| M | 1024 | 1003 | 968 | 940 | 914 | 902 | 868 | 848 | 823 | 806 | 786 | 758 | 739 | 721 | 696 | 656 | 633 | 616 | 593 | 568 | 543 | 515 | 503 | 474 | 437 | 422 | 403 | 372 | 341 | 319 | 302 | 282 | 236 | 205 | 192 | 163 | 136 | 133 | 109 | 108 |
| Y | 1021 | 1002 | 967 | 951 | 919 | 897 | 873 | 851 | 827 | 812 | 784 | 761 | 738 | 714 | 696 | 651 | 646 | 614 | 591 | 568 | 544 | 523 | 500 | 475 | 439 | 433 | 400 | 370 | 344 | 320 | 298 | 267 | 231 | 219 | 180 | 154 | 139 | 130 | 119 | 107 |
| K | 1020 | 996 | 975 | 945 | 910 | 896 | 869 | 842 | 835 | 807 | 794 | 764 | 738 | 716 | 692 | 663 | 638 | 612 | 587 | 561 | 537 | 527 | 499 | 470 | 445 | 425 | 399 | 366 | 342 | 313 | 298 | 278 | 243 | 210 | 188 | 157 | 137 | 127 | 121 | 104 |

FIG. 8G3 — CORRECTION VALUE (883D)

| DENSITY | 100 | 97 | 93 | 90 | 87 | 84 | 81 | 78 | 75 | 72 | 69 | 66 | 63 | 60 | 57 | 54 | 51 | 48 | 37 | 34 | 31 | 27 | 24 | 21 | 18 | 30 | 28 | 26 | 24 | 22 | 20 | 18 | 16 | 14 | 12 | 10 | 8 | 6 | 4 | 2 |
|---|---|---|---|---|---|---|---|---|---|---|---|---|---|---|---|---|---|---|---|---|---|---|---|---|---|---|---|---|---|---|---|---|---|---|---|---|---|---|---|---|
| C | 5 | 0 | -3 | 8 | 3 | -7 | -1 | 1 | 2 | -5 | -6 | -3 | 2 | 5 | 0 | -1 | 8 | 3 | -7 | 1 | 5 | 2 | 5 | 0 | -3 | 5 | 3 | -7 | 1 | 5 | 5 | 0 | 5 | 8 | 3 | -7 | -1 | 5 | 2 | 2 |
| M | -4 | -5 | 3 | 0 | -4 | -3 | 3 | 2 | 6 | -5 | 4 | 2 | 0 | -4 | -5 | 3 | 0 | -4 | -3 | 3 | 2 | 6 | -4 | -5 | 3 | 0 | -4 | -3 | 3 | 2 | -4 | -5 | 3 | 0 | -4 | -3 | 3 | 2 | 6 | -5 |
| Y | -1 | 9 | -8 | -5 | -1 | 0 | -1 | -1 | -3 | -5 | 0 | 0 | -1 | -1 | -5 | 9 | -5 | -1 | 0 | -1 | -1 | -3 | -1 | -5 | -5 | -8 | -1 | 0 | -1 | -8 | -1 | -5 | 9 | -8 | -1 | -3 | -1 | -2 | -3 | -5 |
| K | 0 | -1 | -4 | -5 | -5 | 3 | 2 | 8 | -6 | -1 | -4 | -1 | 0 | 0 | -1 | -4 | 0 | 0 | 3 | 2 | 8 | -6 | 0 | -1 | -4 | -5 | -5 | 3 | 2 | 8 | 0 | -1 | -4 | -5 | 0 | 3 | 2 | 8 | -6 | -1 |

FIG. 10A

| PRINTING ORDER | PRINT JOB NAME |
|---|---|
| 1 | Job1 |
| 2 | Job2 |
| 3 | Job3 |
| 4 | Job4 |
| 5 | Job5 |
| 6 | Job6 |
| 7 | Job7 |

| | 1 | 2 | 3 | 4 | 5 | 6 | 7 | 8 | 9 | 10 |
|---|---|---|---|---|---|---|---|---|---|---|
| | JOB NAME | COLOR MODE | DESIGNATED COLOR | AUTOMATIC ADJUSTMENT | MARK PRINTING METHOD | PATCH PRINTING IN MARGIN AREA | PATCH PRINTING PRIORITY ORDER C | PATCH PRINTING PRIORITY ORDER M | PATCH PRINTING PRIORITY ORDER Y | PATCH PRINTING PRIORITY ORDER K |
| a | Job1 | CMYK | CMYK | PRESENT | CMYK PATCH PRINTING ON ALL PAGES | — | — | — | — | — |
| b | Job2 | CMYK | CMYK | PRESENT | PRINT ONLY PATCHES OF COLORS USED ON PAGE | NOT PRESENT | — | — | — | — |
| c | Job3 | CMYK | C,M | PRESENT | PRINT ONLY PATCHES OF COLORS USED ON PAGE | NOT PRESENT | — | — | — | — |
| d | Job4 | CMYK | C,M,Y | PRESENT | PRINT ONLY PATCHES OF COLORS USED ON PAGE | PRESENT | 1 | 2 | 3 | — |
| e | Job5 | CMYK | C,M,Y | PRESENT | PRINT ONLY PATCHES OF COLORS USED ON PAGE | PRESENT | 1 | — | — | — |
| f | Job6 | CMYK | C | PRESENT | PRINT ONLY PATCHES OF COLORS USED ON PAGE | PRESENT | 1 | — | — | — |
| g | Job7 | GRAYSCALE | — | PRESENT | PRINT ONLY PATCHES OF COLORS USED ON PAGE | PRESENT | — | — | — | 1 |

FIG. 11A

| | PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|---|
| a | 1 | CMYK | C1 | Y1 | K1 | M1 |
| b | 2 | C,M,Y | C1 | Y1 | K1 | M1 |
| c | 3 | ... | ... | ... | ... | ... |

Job1, 1101

FIG. 11B

| | PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|---|
| a | 1 | C,M | C1 | ... | ... | M1 |
| b | 2 | K | ... | ... | K1 | ... |
| c | 3 | ... | ... | ... | ... | ... |

Job2, 1102

FIG. 11C

| | PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|---|
| a | 1 | C,M | C1 | ... | ... | M1 |
| b | 2 | C | C1 | ... | ... | ... |
| c | 3 | ... | ... | ... | ... | ... |

Job3, 1103

FIG. 11D

| | PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|---|
| a | 1 | C | C4 | C4 | C4 | C4 |
| b | 2 | C,M | C2 | C2 | M2 | M2 |
| c | 3 | C,M,Y | C2 | Y1 | C2 | M1 |
| d | 4 | ... | ... | ... | ... | ... |

Job4, 1104

FIG. 11E

Job5

| PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|
| 1 | C,M | C3 | C3 | C3 | M1 |
| 2 | ... | ... | ... | ... | ... |

FIG. 11F

Job6

| PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|
| 1 | C | C4 | C4 | C4 | C4 |
| 2 | ... | ... | ... | ... | ... |

FIG. 11G

Job7

| PAGE NUMBER | USED TONER COLOR | AREA 1 (DEFAULT: C) | AREA 2 (DEFAULT: Y) | AREA 3 (DEFAULT: K) | AREA 4 (DEFAULT:M) |
|---|---|---|---|---|---|
| 1 | K | K4 | K4 | K4 | K4 |
| 2 | ... | ... | ... | ... | ... |

IMAGE FORMING APPARATUS WITH PER-PAGE MANAGEMENT OF TONE CORRECTION PATCHES AND METHOD THEREOF

BACKGROUND OF THE INVENTION

Field of the Invention

The present invention relates to image forming apparatuses, and particularly relates to processing for suppressing tonal fluctuation during printing.

Description of the Related Art

As a way to suppress image quality fluctuations when printing large numbers of pages, an image forming apparatus can print tone patches in the print margins of output paper, measure the tone patches using a colorimetric sensor provided downstream from an image forming unit, and feed back correction values to an image generating unit. This processing will be called "real-time tone correction" hereinafter.

Various methods for adjusting color in devices have been proposed thus far. For example, Japanese Patent No. 6422923 describes adjusting the color of a device before printing a job. To adjust the color of a device, a large number of patches may be printed, resulting in a color chart being printed over multiple sheets. Furthermore, if, as a result of comparing a patch that has been read with a target color, it is found that color adjustment is necessary, it is necessary to adjust the color and then print the color chart again for comparison with the target color. According to Japanese Patent No. 6422923, in cases where color measurement is performed by printing a color chart across multiple sheets, means for quickly detecting the need for color adjustment due to differences in color from the target color is provided. Specifically, in pre-verification, the difference between the target color and each color patch is checked, and the color patches are laid out so that the color patch having the greatest difference is printed first. Then, when reading the printed color patches while printing the color chart, if color adjustment is required due to a difference in color from the target color, the printing of the color chart is stopped and the color is adjusted. This eliminates wasteful color chart printing.

Incidentally, print data includes two types: what is known as "full-color printing", which uses all the toners (e.g., cyan, magenta, yellow, and black) available in the image forming apparatus; and "limited-color printing", which forms an image on paper having limited the number of toners used. Some print data contains a mixture of pages having full-color images and pages having a limited number of colors. Even if a printing system manages the number of colors on a page-by-page basis, all patches for real-time tone correction will be printed on every page. In this case, color patches aside from black toner are also printed on black-and-white pages, causing the black-and-white pages to be determined to be color pages, which in turn makes it impossible to manage the number of colors on each page.

SUMMARY OF THE INVENTION

Accordingly, an image forming apparatus and a control method thereof are provided which enable precise color number management on a page-by-page basis by switching a type of tone patch to be printed for each color type used in the page to be printed.

The present invention has the following configuration. That is, according to one aspect of the present invention, an image forming apparatus is provided, which comprises one or more processors and one or more memory comprising one or more programs, wherein the one or more programs are configured to cause the one or more processors to: determine a color of a tone patch for tone correction, to be composited with an image, in accordance with a color component used in the image; generate a patch-included image by compositing the tone patch of the color determined with the image; generate a corrected image by performing tone correction on the patch-included image on the basis of tone correction information for each color component; form the corrected image on a medium; and perform color measurement of the tone patch formed on the medium and update the tone correction information on the basis of a value measured.

According to the present invention, precise color number management can be performed on a page-by-page basis by switching a type of tone patch to be printed for each color type used in the page to be printed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain principles of the present invention.

FIG. 3B is a block diagram illustrating the software configuration of the image forming apparatus.

FIG. 4A-1 is a sequence chart illustrating printing processing.

FIGS. 4A-2 and 4A-3 are sequence charts illustrating printing processing.

FIG. 4B is a sequence chart illustrating printing processing.

FIG. 5 illustrates a sequence of reference value/correction value registration/deletion processing.

FIG. 8A illustrates a patch position for real-time tone correction and a sensor reading position.

FIG. 8D1 illustrates a reference value management table for tone correction.

FIG. 8D2 illustrates a correction value management table.

FIG. 8E1 illustrates a sample of reference values for tone correction (in 20 levels).

FIG. 8E2 illustrates a sample of measurement values for tone correction (in 20 levels).

FIG. 8E3 illustrates a sample of correction values for tone correction (in 20 levels).

FIG. 8F1 illustrates a sample of reference values for tone correction (in 30 levels).

FIG. 8F2 illustrates a sample of measurement values for tone correction (in 30 levels).

FIG. 8F3 illustrates a sample of correction values for tone correction (in 30 levels).

FIG. 8G1 illustrates a sample of reference values for tone correction (in 40 levels).

FIG. 8G2 illustrates a sample of measurement values for tone correction (in 40 levels).

FIG. 8G3 illustrates a sample of correction values for tone correction (in 40 levels).

FIG. 10A illustrates a table holding jobs.

FIG. 10B illustrates a job attribute table.

FIGS. 11A to 11G illustrate used toner color information and patch color layers for each page of each job.

DESCRIPTION OF THE EMBODIMENTS

First Embodiment

Figure 1:
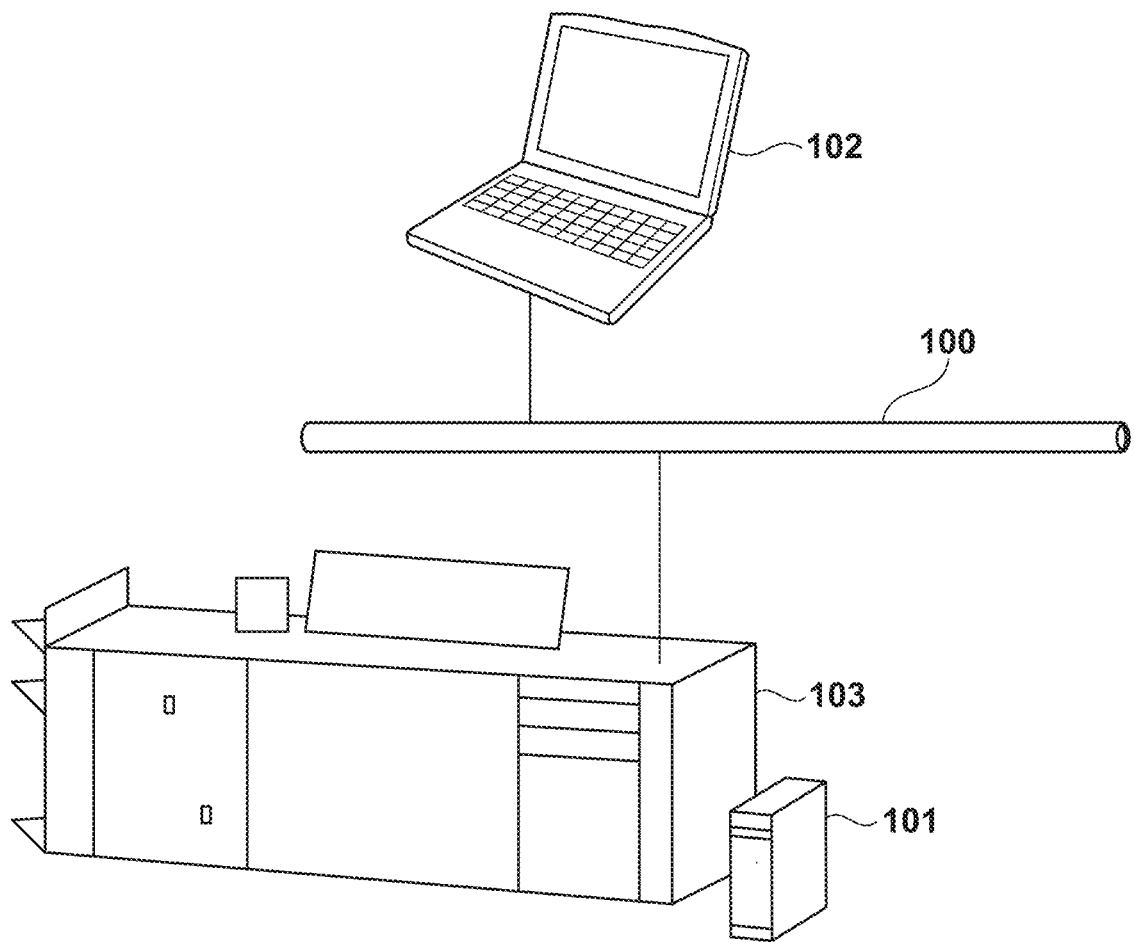
FIG. 1 is a diagram illustrating the configuration of a printing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Hardware Configuration

FIG. 1 is a diagram illustrating the configuration of a printing system serving as an embodiment of the present invention. As illustrated in FIG. 1, the printing system is constituted by an information processing apparatus 102, an image processing apparatus 101, and an image forming apparatus 103, which are connected by a LAN 100 (network). The image processing apparatus 101 and the image forming apparatus 103 can print a print job received from the information processing apparatus 102. The information processing apparatus 102 is also capable of generating print jobs.

Figure 2A:
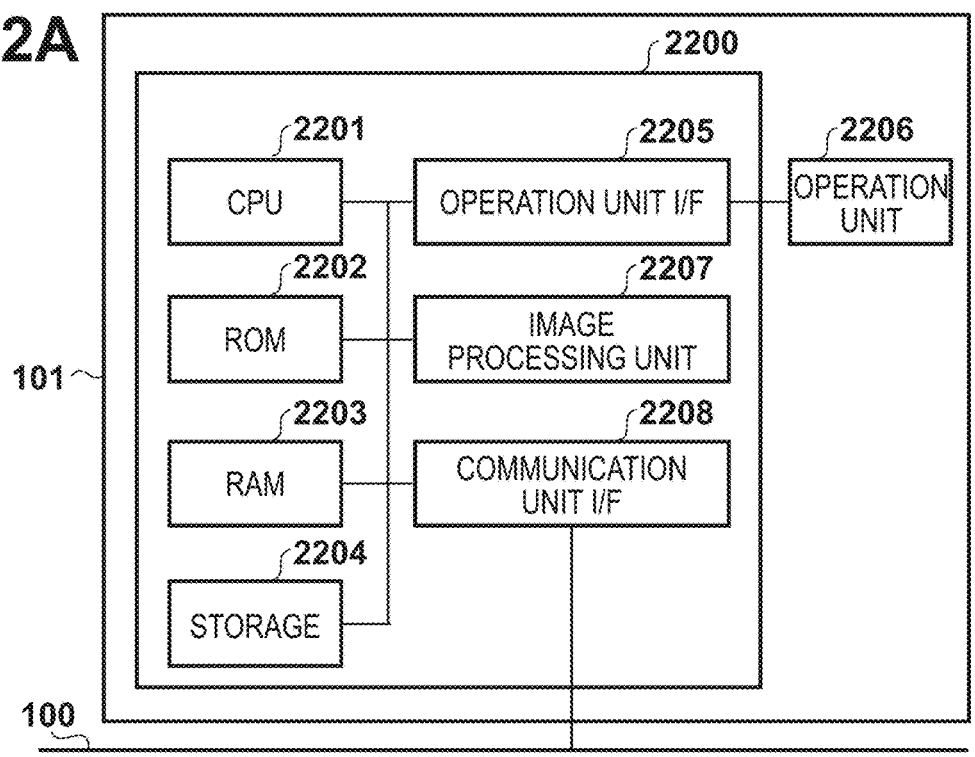
FIG. 2A is a block diagram illustrating the hardware configuration of an image processing apparatus.

FIG. 2A is a block diagram illustrating the hardware configuration of the image processing apparatus 101 according to the present embodiment. The image processing apparatus 101 has a function for forming an image to be printed onto a sheet. A control unit 2200, which includes a central processing unit (CPU) 2101, controls the operations of the image processing apparatus 101 as a whole. The CPU 2201 performs various types of control, such as printing control, by loading programs stored in read-only memory (ROM) 2202 or storage 2204 into RAM 2203 and executing those programs. The ROM 2202 can store control programs, a boot program, and the like that can be executed by the CPU 2201. The RAM (random access memory) 2203 is primary storage memory of the CPU 2201, and is used as a work area or a temporary storage region for loading various types of control programs. The storage 2204 stores print data, image data, various types of programs, and various types of settings information. Although the present embodiment assumes an auxiliary storage device such as an HDD (Hard Disk Drive) is used as the storage 2204, non-volatile memory such as an SSD (Solid State Drive) may be used as well. With the image processing apparatus 101 according to the embodiment, the one CPU 2201 is assumed to execute the various processes in the flowcharts described later using a single instance of memory (the RAM 2203). However, another form may be employed instead. For example, the processes in the flowcharts described later may also be executed by having a plurality of CPUs, RAM, ROM, and storage operating cooperatively. Some processes may be executed using hardware circuitry such as an ASIC (Application Specific Integrated Circuit) or an FPGA (Field-Programmable Gate Array).

An operation unit interface (I/F) 2205 connects an operation unit 2206 to the control unit 2200. The operation unit 2206 is provided with a display unit having touch panel functionality, various types of physical keys, and so on, and functions as a display unit that displays information, an accepting unit that accepts user instructions, and the like.

An image processing unit 2207 has RIP (Raster Image Processor) functionality for generating image data used in printing based on a print job received via a communication unit I/F 2208. The image processing unit 2207 can also perform resolution conversion, correction processing, and the like on the image data created based on the print job. Although the image processing unit 2207 is assumed to be realized by hardware circuitry (ASIC, FPGA, or the like) in the present embodiment, the image processing unit 2207 is not limited thereto. For example, the image processing apparatus 101 may further include a processor for image processing applications, and the processor may realize image processing, processing for creating print data, and the like by that processor executing an image processing program. In this case, it is assumed that the processor and the CPU 2201 operate cooperatively to realize the flowcharts described later. Furthermore, a configuration in which the CPU 2201 executes a program to perform image processing, and performs image processing, processing for creating the print data, and so on can be employed as well. The image processing may also be performed through a combination of any of these.

The control unit 2200 is also connected to the LAN 100 via the communication unit I/F 2208. The communication unit I/F 2208 receives a print request (a print job) from the information processing apparatus 102 on the LAN 100. A print image generated by the image processing apparatus 101 is sent to the image forming apparatus 103 over the LAN 100 along with a printing control command, and a printing result is then received.

Although present embodiment describes the above configuration as an example of a printing system, the configuration is not limited thereto, and it is sufficient for at least one information processing device and printing device to be communicably connected over a network. The network may be wireless or wired.

Figure 2B:
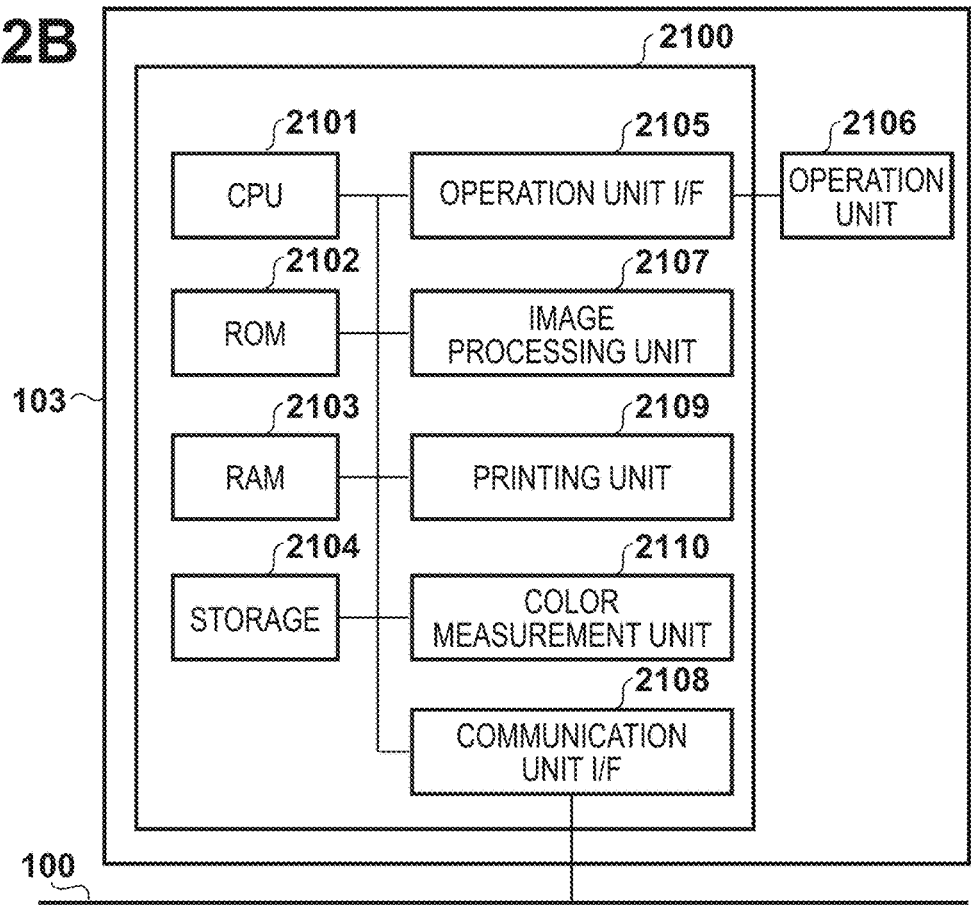
FIG. 2B is a block diagram illustrating the hardware configuration of an image forming apparatus.

FIG. 2B is a block diagram illustrating the hardware configuration of the image forming apparatus 103 according to the present embodiment. The image forming apparatus 103 has a function for forming an image to be printed onto a sheet. Although the present embodiment will describe an image forming apparatus as an example, the image forming apparatus may be a multi-function peripheral (MFP) or the like in which an image forming apparatus includes a scanner, fax functionality, or the like. A control unit 2100, which includes a CPU (Central Processing Unit) 2101, controls the operations of the image forming apparatus 103 as a whole. The CPU 2101 performs various types of control, such as printing control, reading control, and the like, by loading programs stored in ROM (Read Only Memory) 2102 or storage 2104 into RAM 2103 and executing those programs. The ROM 2102 can store control programs, a boot program, and the like that can be executed by the CPU 2101. The RAM (Random Access Memory) 2103 is primary storage memory of the CPU 2101, and is used as a work area or a temporary storage region for loading various types of control programs. The storage 2104 stores print data, image data, various types of programs, and various types of settings information. Although the present embodiment assumes an auxiliary storage device such as an HDD (Hard Disk Drive) is used as the storage 2104, non-volatile memory such as an SSD (Solid State Drive) may be used as well. With the image forming apparatus 103 according to the embodiment, the one CPU 2101 is assumed to execute the various processes in the flowcharts described later using a single instance of memory (the RAM 2103). However, another form may be employed instead. For example, the processes in the flowcharts described later may also be executed by having a plurality of CPUs, RAM, ROM, and storage operating cooperatively. Some processes may be executed using hardware circuitry such as an ASIC (Application Specific Integrated Circuit) or an FPGA (Field-Programmable Gate Array).

An operation unit interface (I/F) 2105 connects an operation unit 2106 to the control unit 2100. The operation unit 2106 is provided with a display unit having touch panel functionality, various types of physical keys, and so on, and functions as a display unit that displays information, an accepting unit that accepts user instructions, and the like.

An image processing unit 2107 has RIP (Raster Image Processor) functionality for generating image data used in printing based on a print job received via a communication unit I/F 2108. The image processing unit 2107 can also perform resolution conversion, correction processing, and the like on the image data created based on the print job. Although the image processing unit 2107 is assumed to be realized by hardware circuitry (ASIC, FPGA, or the like) in the present embodiment, the image processing unit 2107 is not limited thereto. For example, the image forming apparatus 103 may further include a processor for image processing applications, and the processor may realize image processing, processing for creating print data, and the like by that processor executing an image processing program. In this case, it is assumed that the processor and the CPU 2101 operate cooperatively to realize the flowcharts described later. Furthermore, a configuration in which the CPU 2101 executes a program to perform image processing, and performs image processing, processing for creating the print data, and so on can be employed as well. The image processing may also be performed through a combination of any of these.

A printing unit (printer engine) 2109 prints an image on a sheet fed from a paper feed cassette (not shown) on the basis of the image data generated by the image processing unit 2107. The printing method of the printing unit 2109 may be an electrophotographic method or an ink jet method. Other printing methods, such as thermal transfer, can also be applied.

A color measurement unit 2110 is located downstream from the printing unit 2109 in a paper transport path, measures the colors of tone patches of each of colors in tone correction marks formed on the printed paper using a color sensor such as a CIS, and obtains colorimetric data.

The control unit 2100 is also connected to the LAN 100 via the communication unit I/F 2108. The communication unit I/F 2108 receives a print request (a print job) from an information processing apparatus on the LAN 100.

Although the present embodiment describes the above configuration as an example of a printing system, the present invention is not limited thereto, and it is sufficient for at least one information processing device and printing device to be communicably connected over a network. The network may be wireless or wired.

Software Configuration

Figure 3A:
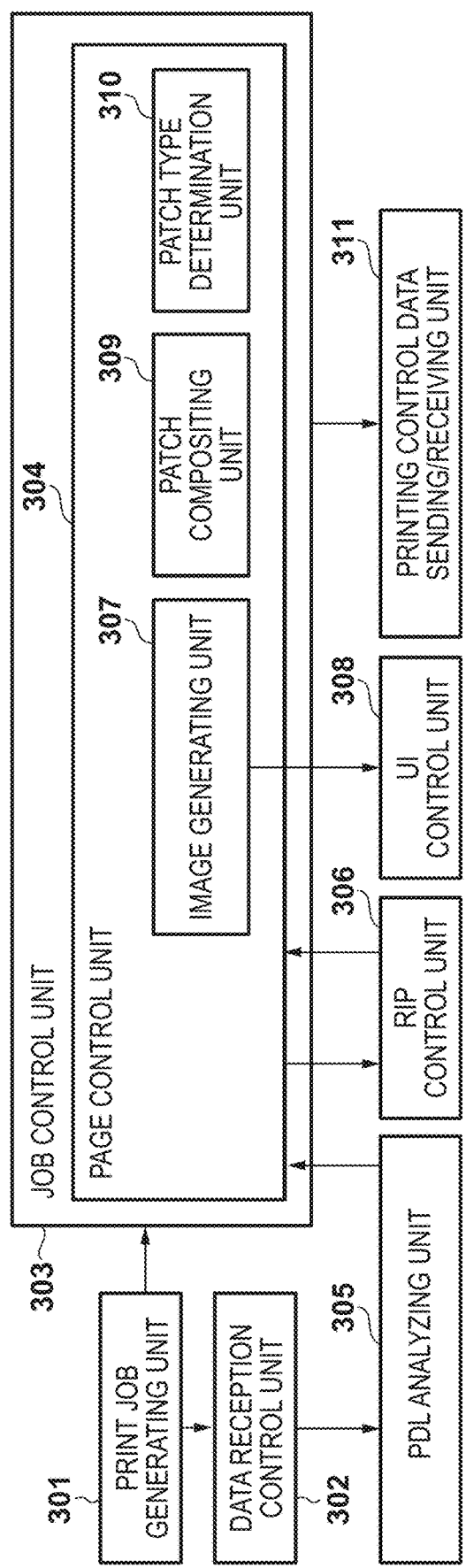
FIG. 3A is a block diagram illustrating the software configuration of the image processing apparatus.

FIG. 3A is a block diagram illustrating the software configuration of the image processing apparatus 101 according to the present embodiment.

A print job generating unit 301 generates a print job in response to a job being submitted, and registers the print job in a job control unit 303. The job control unit 303 notifies a page control unit 304 of the start of processing for all pages included in the registered print job, starting from the first page, and causes page processing to be started. When notified by the page control unit 304 that processing of the next page can begin, the notification of the start of the processing of the next page is repeated. When notified by the page control unit 304 that the processing has ended for all pages, the print job generating unit 301 is notified of the end of the job.

The page control unit 304 controls the processing of each page upon receiving the notification of the start of the page processing from the job control unit 303. If patch type determination and patch composition processing are performed in the image forming apparatus 103, information to that effect is sent to the image forming apparatus 103.

A data reception control unit 302 receives PDL data sent from the information processing apparatus 102 via the communication unit I/F 2208.

A PDL analyzing unit 305 analyzes the received PDL data and converts the PDL data into intermediate data, and a RIP control unit 306 rasterizes the intermediate data and converts the intermediate data into bitmap format image data. The bitmap format image data generated here is sent to a patch type determination unit 310, where a patch type to be composited with the print image, i.e., the type of a tone pattern for tone correction, is determined. The type of the tone pattern may be determined by, for example, the color of a colorant (this will be called a "color component" or a "primary color"). In addition to the color, a tonal difference between single color patches constituting the tone pattern can be changed for each type of tone pattern. In other words, in this example, the type of the tone pattern may be classified by color and by tonal difference between patches. Note that the tone pattern may also be called a "tone patch".

An image generating unit 307 generates a print image for the generated bitmap format image data. The image generating unit 307 also issues a patch composition instruction to a patch compositing unit 309 on the basis of an instruction from the page control unit 304. The image generating unit 307 controls the image processing unit 2207 illustrated in FIG. 2A. The patch compositing unit 309 sends an image composited with the tone patch (also called a "patch-included image") to a printing control data sending/receiving unit 311. The printing control data sending/receiving unit 311 sends the patch-composited data, and an instruction for adjustment in the image forming apparatus 103, via the communication unit I/F 2208. A UI control unit 308 provides a user interface to the operation unit 2206.

FIG. 3B is a block diagram illustrating the software configuration of the image forming apparatus 103 according to the present embodiment.

A data reception control unit 322 receives data sent from the image processing apparatus 101 via the communication unit I/F 2108. A page control unit 324 is included in a job control unit 323, and in response to a notification of the start of page processing from the patch compositing unit 309 of the image processing apparatus 101, instructs a patch type determination unit 337 to perform processing for determining a patch to composite with the image.

The patch type determination unit 337 determines the patch type to be composited with the image from the toner colors used in the print image. This is the same as in the image processing apparatus 101.

An image generating unit 327 generates a print image for the generated bitmap format image data. The image generating unit 327 also transfers the print image to a patch compositing unit 329. Additionally, the image generating unit 327 generates a print image that has been corrected (i.e., a corrected image) by applying correction information for the paper used in the printing to the generated bitmap format image data. Note that the paper used in the printing may be referred to as a "sheet", a "printing medium", a "recording medium", or simply a "medium".

An engine control unit 328 includes the patch compositing unit 329, a correction information storage unit 330, a reference information storage unit 331, a colorimetric sensor control unit 332, a paper feed stage management unit 333, a paper feed control unit 334, and a printing control unit 335.

The patch compositing unit 329 composites tone correction mark information (the tone patch) with the print image such that the tone correction marks are formed in addition to the image formed on the basis of the corrected print image received from the image generating unit 327.

The paper feed control unit 334 controls a paper feed stage in accordance with instructions in the print job, and transports and feeds paper held in the paper feed stage.

The printing control unit 335 prints the print image with which the tone patch has been composited onto the paper supplied by the paper feed control unit 334, and discharges the paper. In the present embodiment, an image is formed on the paper on the basis of image data to which the tone correction mark information (the tone patch) has been added, as necessary.

The colorimetric sensor control unit 332 obtains the colorimetric data by controlling the color measurement unit 2110 to measure the tone correction marks formed on the paper.

The reference information storage unit 331 holds, for each type of paper set in the paper feed stages, reference information generated on the basis of the colorimetric data obtained by the colorimetric sensor control unit 332.

The correction information storage unit 330 holds, for each type of paper set in the paper feed stage, correction information (also called "tone correction information") found by comparing the reference information held by the reference information storage unit 331 with the colorimetric data obtained by the colorimetric sensor control unit 332.

The paper feed stage management unit 333 manages information on all the sizes, types, and the like of the paper set in all of the paper feed stages provided in the image forming apparatus 103. In addition, in response to a request from a UI control unit 336 to register paper, the reference information for a type of paper to be removed for replacement, which is held by the reference information storage unit 331, is cleared. Furthermore, if the correction information storage unit 330 holes the correction information for the type of paper to be removed for replacement, that correction information is cleared as well.

When a user operates the operation unit 2106 and information on the paper is set in the paper feed stage, the UI control unit 336 requests the paper feed stage management unit 333 to register the paper. Information on the registered paper is displayed in the operation unit 2106.

In the present embodiment, the print job generating units 301 and 321, the PDL analyzing units 305 and 325, and the RIP control units 306 and 326 are provided in the image forming apparatus 103 and the image processing apparatus 101. This is so that both the image processing apparatus and the image forming apparatus can perform print job generation, PDL analysis, and RIP control. However, these processes for print jobs can be performed by either of the image processing apparatuses. The present embodiment describes an example in which the processes are performed by the image processing apparatus 101.

Basic Operation Sequence of Printing Processing (First Example)

Figures 1, 4A:
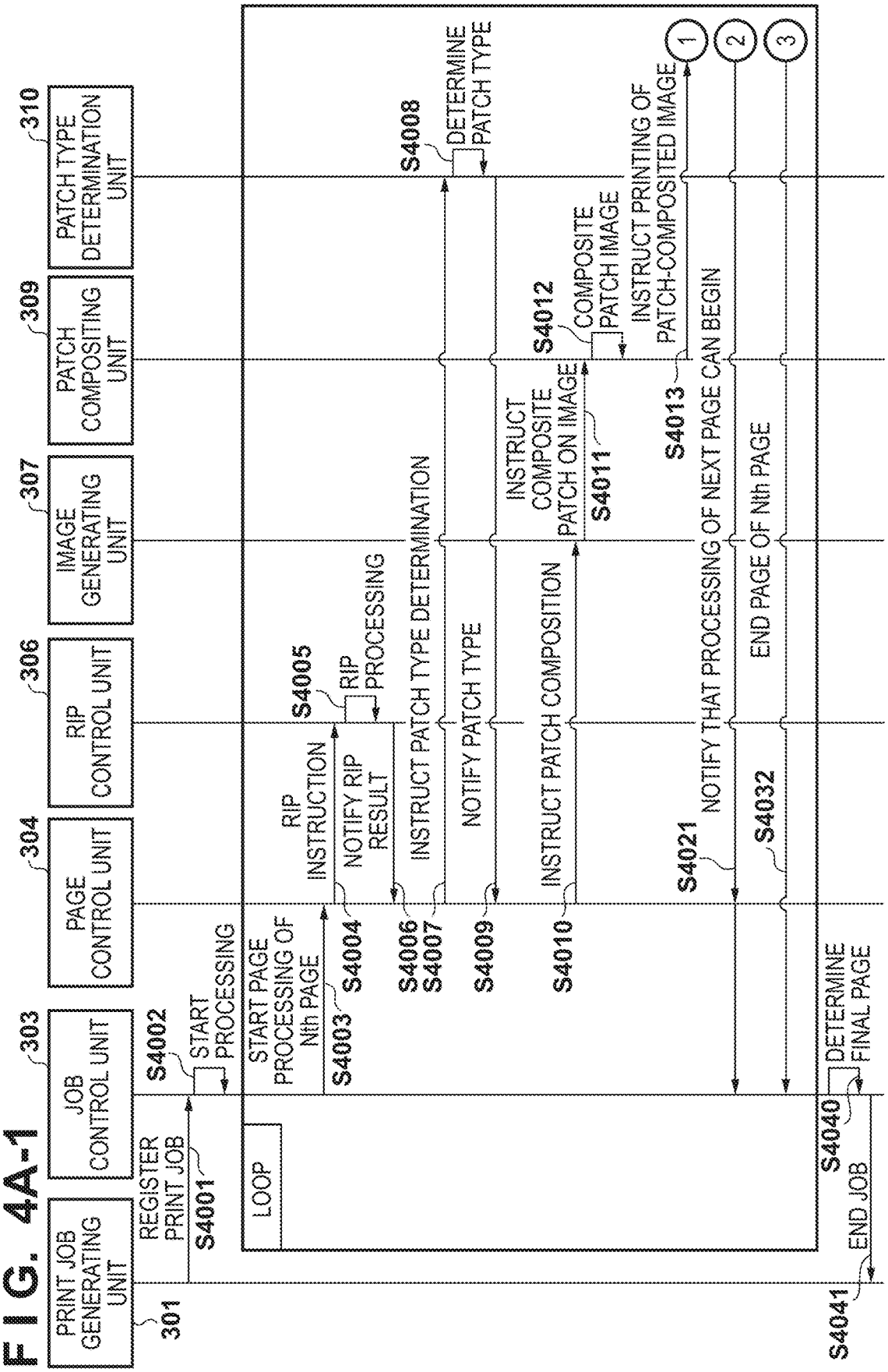
Figures 2, 4A:
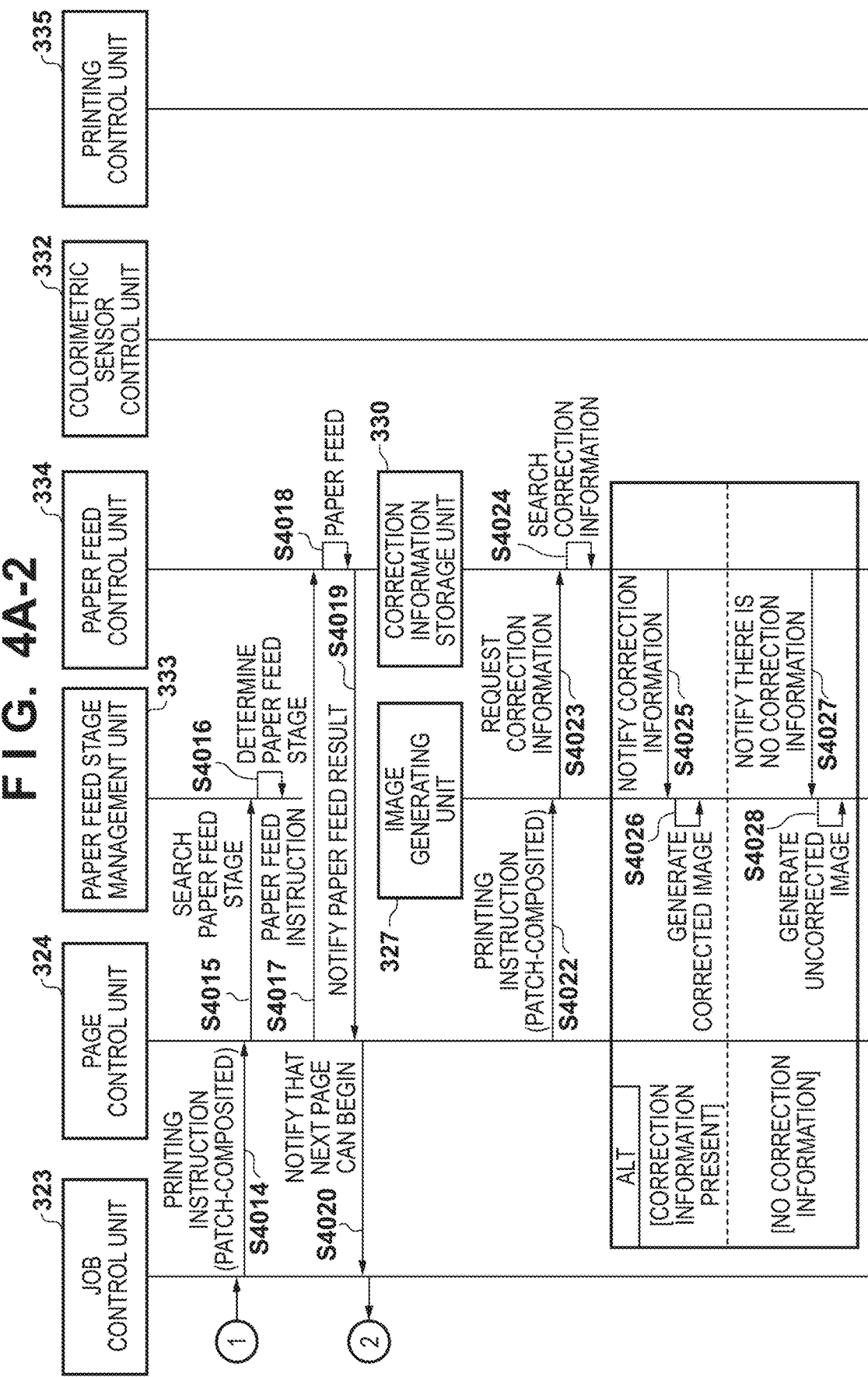
Figures 3, 4A:
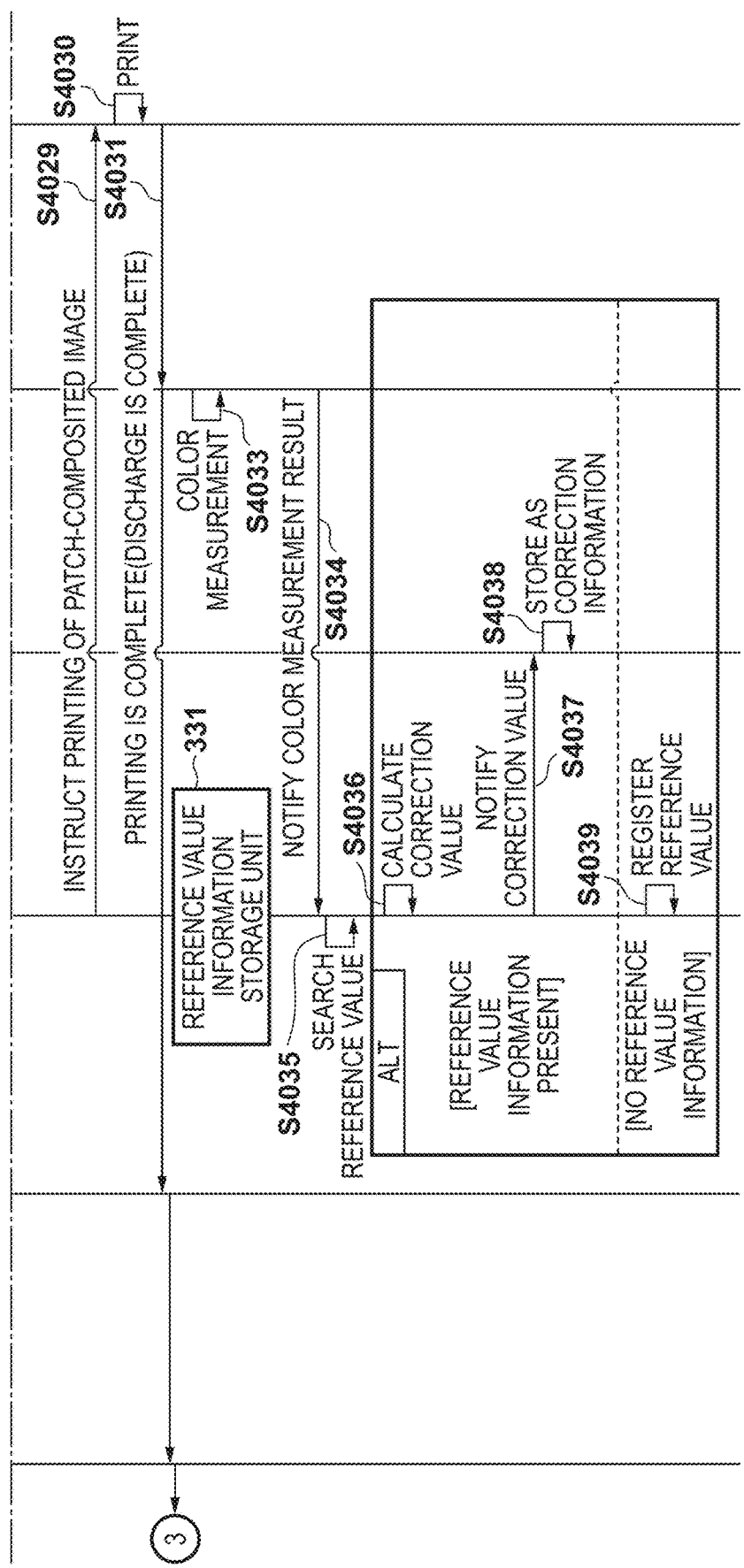

A sequence of basic operations in the printing processing will be described next with reference to FIGS. 4A-1 to 4A-3. Note that FIGS. 4A-1 to 4A-3 are diagrams obtained by dividing a single diagram, and may be referred to collectively as "FIG. 4A" hereinafter. FIGS. 4A-1 to 4A-3 are connected by instructions or notifications with circled numbers 1, 2, and 3. Although the present embodiment describes an example in which the patch type determination and patch image composition are performed by the image processing apparatus 101 or the image forming apparatus 103, FIG. 4A illustrates a case where the image processing apparatus 101 performs the patch type determination and the patch image composition.

The sequence in FIG. 4A-1 is realized by the CPU 2201 of the image processing apparatus 101 reading out a program stored in the ROM 2202 into the RAM 2203 and executing the program. Likewise, the sequence in FIG. 4A-2 to FIG. 4A-3 is realized by the CPU 2101 of the image forming apparatus 103 reading out a program stored in the ROM 2102 into the RAM 2103 and executing the program.

The print job generating unit 301 receives, for example, data to be printed and a printing instruction from the information processing apparatus 102 via the communication unit I/F 2208, and generates a print job. The job generated by the print job generating unit 301 is registered in the job control unit 303 (S4001).

The job control unit 303 determines an execution order of the registered job and starts the execution in sequence (S4002). The job for which execution is started by the job control unit 303 notifies the page control unit 304 of the start of processing of an Nth page (S4003).

Upon receiving the notification of the start of processing of the Nth page from the job control unit 303, the page control unit 304 issues a RIP instruction to the RIP control unit 306 (S4004). Note that "RIP" refers to raster image processing, i.e., processing for creating raster image data. This processing is called "RIP processing", and the raster image data may also be called "RIP data" or a "RIP result".

The RIP control unit 306 performs the RIP processing in response to the RIP instruction from the page control unit 304 (S4005). The toner colors used in the image are then communicated, along with the RIP result, to the page control unit 304 (S4006). For example, if the colors of the original image are converted to toner color components through the RIP processing for a page image, color components where the density of all pixels after conversion is zero are unused colors, whereas the other color components are used colors.

The page control unit 304 notifies the patch type determination unit 310 of the toner colors used in the image of the Nth page (S4007). The patch type determination unit 310 determines the patch type (S4008). The result, i.e., the determined patch type, is then returned to the page control unit 304 (S4009). The page control unit 304 designates an image and a patch type, and instructs the image generating unit 307 to composite the patch (S4010). The image generating unit 307 sends the image, the patch type, and a patch composition instruction for the image, to the patch compositing unit 309 (S4011). The patch compositing unit 309 composites the patch image of the designated type (i.e., the tone pattern) with the image sent from the image generating unit 307 (S4012). The image composited with the patch image is then sent to the job control unit 323 (S4013).

The job control unit 323 sends the received print job to the page control unit 324 (S4014). Upon receiving the notification of the start of the processing of the Nth page from the job control unit 323, the page control unit 324 queries the paper feed stage management unit 333 as to from which paper feed stage the designated paper size and paper type of that page is to be fed (S4015). The paper feed stage management unit 333 determines from which paper feed stage to paper is to be fed based on the designated paper size and paper type (S4016), and returns a result thereof to the page control unit 324.

The page control unit 324 instructs the paper feed control unit 334 to feed paper from the paper feed stage determined by the paper feed stage management unit 333 (S4017). In accordance with the paper feed instruction from the page control unit 324, the paper feed control unit 334 feeds paper from the designated paper feed stage (S4018), and notifies the page control unit 324 of a paper feed result (S4019). Upon receiving a normal paper feed result from the paper feed control unit 334, the page control unit 324 notifies the job control unit 323 that the processing of the next page can start (S4020). Additionally, when the job control unit 323 notifies the page control unit 304 thereof, the page control unit 304 also notifies the job control unit 303 thereof (S4021). As a result, the next page processing can start.

Additionally, after S4020 has ended, the page control unit 324 instructs the image generating unit 327 to print the patch-composited image (S4022). Upon receiving the print image printing instruction, the image generating unit 327 requests the correction information from the correction information storage unit 330 on the basis of the information communicated along with the printing instruction (S4023). The information communicated along with the printing instruction may include information indicating the paper type, finishing processing, and the like. For example, the information may be at least one of the following information: the type of paper, such as coated paper or standard paper; the type of finish, such as whether or not varnish coating is applied; and so on. The correction information is determined on the basis of this information, and thus this information may be called, for example, "parameter information" specifying the correction information.

The correction information storage unit 330 searches out the correction information corresponding to the received information, e.g., the tone correction information, from a storage region, e.g., the RAM 2203 (S4024). When the corresponding correction information is found, the correction information storage unit 330 communicates the correction information to the image generating unit 327 (S4025). Using the correction information communicated from the correction information storage unit 330, the image generating unit 327 generates a corrected print image, i.e., the corrected image (S4026).

On the other hand, when the correction information corresponding to the received information cannot be found, the correction information storage unit 330 notifies the image generating unit 327 that there is no corresponding correction information (S4027). When there is no correction information, the image generating unit 327 generates an uncorrected print image, i.e., an uncorrected image (S4028). The image generating unit 327 instructs printing by sending, to the printing control unit 335, the paper feed stage, paper size, and paper type information for printing the generated image (S4029).

The printing control unit 335 prints the received image (the tone pattern-composited image) onto the paper fed by the paper feed control unit 334 (S4030). The tone pattern may also be called "tone correction mark information". Once the printing is complete, the printing control unit 335 notifies the page control unit 324 and the colorimetric sensor control unit 332 that the printing is complete (that discharge is complete) (S4031). Information on the paper feed stage, the paper size, the paper type, and the like is added to the notification that the printing is complete (that discharge is complete).

Upon receiving the notification that the printing is complete (that discharge is complete) from the printing control unit 335, the page control unit 324 notifies the job control unit 303 that the processing of the Nth page is complete via the job control unit 323 and the page control unit 304 (S4021, S4032).

On the other hand, upon receiving the notification that the printing is complete (that discharge is complete) from the printing control unit 335, the colorimetric sensor control unit 332 measures the tone correction mark information (the tone patch) printed in S4030 (S4033). Next, the color measurement result and the information such as the paper feed stage, the paper size, the paper type, and the like communicated from the printing control unit 335 are associated with each other and communicated to the reference information storage unit 331 (S4034).

The reference information storage unit 331 searches for whether or not reference values corresponding to the information such as the paper feed stage, the paper size, the paper type, and the like communicated from the colorimetric sensor control unit 332 are stored in the RAM 2203 (S4035). If reference values corresponding to the communicated information are stored, correction values are calculated from the stored reference values and the color measurement result communicated from the colorimetric sensor control unit 332 (S4036). The correction values can be calculated, for example, by calculating a difference between a colorimetric value and the reference value for each tone. Next, the reference information storage unit 331 notifies the correction information storage unit 330 of the calculated correction values (S4037). The correction information storage unit 330 stores the content communicated from the reference information storage unit 331 as the correction information (S4038).

If there is no corresponding reference value stored in S4035, the reference information storage unit 331 stores the information communicated from the colorimetric sensor control unit 332 (the color measurement result, the paper feed stage, the paper size, the paper type, and the like) as the reference values in the RAM 2203 (S4039). For example, the paper feed stage, the paper size, and the paper type may be associated with the colorimetric value as an index.

Here, the processing from S4003 to S4039 is indicated as a loop, i.e., that the processing is executed for all pages in the print job registered in the job control unit 303. The start of the processing for each page, indicated in S4003, can be performed upon receiving a notification that the processing of the next page can start in S4009.

Upon receiving a notification that the processing of the Nth page is complete, the job control unit 303 determines whether or not the Nth page is the final page of the print job (S4040). Upon determining, based on the final page, that a notification of completion has been received, the job control unit 303 notifies the print job generating unit 301 of the end of the job (S4041).

Through the foregoing sequence, a tone patch based on the color components of each page included in a job is composited with each page, and images are formed while correcting using the corresponding correction information. The colorimetric values of the tone patch formed in the image are obtained and fed back as the correction information to correct the color. In this case, by compositing the tone patches according to the color components of each page, the number of colors per page can be managed precisely. This also makes it possible to reduce the cost of printing.

Basic Operation Sequence of Printing Processing (Second Example)

A sequence of basic operations in the printing processing will be described next with reference to FIG. 4B. In the sequence in FIG. 4A, the determination of the patch type and the compositing of the patch were performed by the image processing apparatus 101; however, FIG. 4B illustrates a case where the determination of the patch type and the compositing of the patch are performed by the image forming apparatus 103. The same processes or messages as those in FIG. 4A are indicated by the same reference signs.

The sequence in FIG. 4B is realized by the CPU 2201 of the image processing apparatus 101 reading out a program stored in the ROM 2202 into the RAM 2203 and executing the program. The sequence is furthermore realized by the CPU 2101 of the image forming apparatus 103 reading out a program stored in the ROM 2102 into the RAM 2103 and executing the program.

The print job generating unit 301 receives information from the I/F and generates a print job. The job generated by the print job generating unit 301 is registered in the job control unit 303 (S4001).

The job control unit 303 determines an execution order of the registered job and starts processing in sequence (S4002). The job for which processing is started by the job control unit 303 notifies the page control unit 304 of the start of processing of an Nth page (S4003). Upon receiving the notification of the start of processing of the Nth page from the job control unit 303, the page control unit 304 issues a RIP instruction to the RIP control unit 306 (S4004). The RIP control unit 306 performs the RIP processing in response to the RIP instruction from the page control unit 304 (S4005). The toner colors used in the image are then communicated along with the RIP result (S4006). Up to this point, the sequence is the same as that illustrated in FIG. 4A-1.

The page control unit 304 receives the RIP result and sends printing and adjustment instructions for the post-RIP image to the page control unit 324 of the image forming apparatus 103 (S4057). The page control unit 324 notifies the patch type determination unit 337 of the toner colors used in the image of the Nth page (S4058). The patch type determination unit 337 determines the patch type (S4059). The result is then returned to the page control unit 324 (S4060). The page control unit 324 instructs the image generating unit 327 to composite the patch (S4061). The image generating unit 327 sends the image, the patch type, and a patch composition instruction for the image, to the patch compositing unit 329 (S4062). The patch compositing unit 329 performs patch composition on the image sent from the image generating unit 327 (S4063). A result of the composited image is then sent to the page control unit 324 (S4064).

The subsequent sequence is the same as the sequence after S4015 in FIG. 4A-2 and will therefore not be described. S4003 to S4039 being repeated for each page until the job ends is also the same as in FIG. 4A. The above-described sequence can realize color management in the same way as the sequence in FIG. 4A. Furthermore, by performing the patch determination and patch composition in the image forming apparatus 103, for example, the image forming apparatus 103 can be given the correction information, which reduces the processing load on the image processing apparatus 101 and reduces the resources required.

Clearing of Reference Information and Correction Information

A sequence for clearing the reference information and correction information will be described next with reference to FIG. 5. This sequence is realized by the CPU 2101 of the image forming apparatus 103 reading out a program stored in the ROM 2102 into the RAM 2103 and executing the program.

When the image forming apparatus 103 forms an image on paper, characteristics differ depending on the paper type, and it is therefore necessary to hold reference information for each paper type in order for the image forming apparatus 103 to correctly perform tone correction. Although the image forming apparatus 103 supports a large number of paper types, it is necessary for the paper to be actually used to be set in the paper feed stage, and the reference information storage unit 331 therefore holds only the reference information for the paper type that is set in the paper feed stage. As such, when a user sets new paper in the paper feed stage of the image forming apparatus 103, the reference information for the paper type to be removed for replacement, and the correction information, are cleared.

Figure 7A:
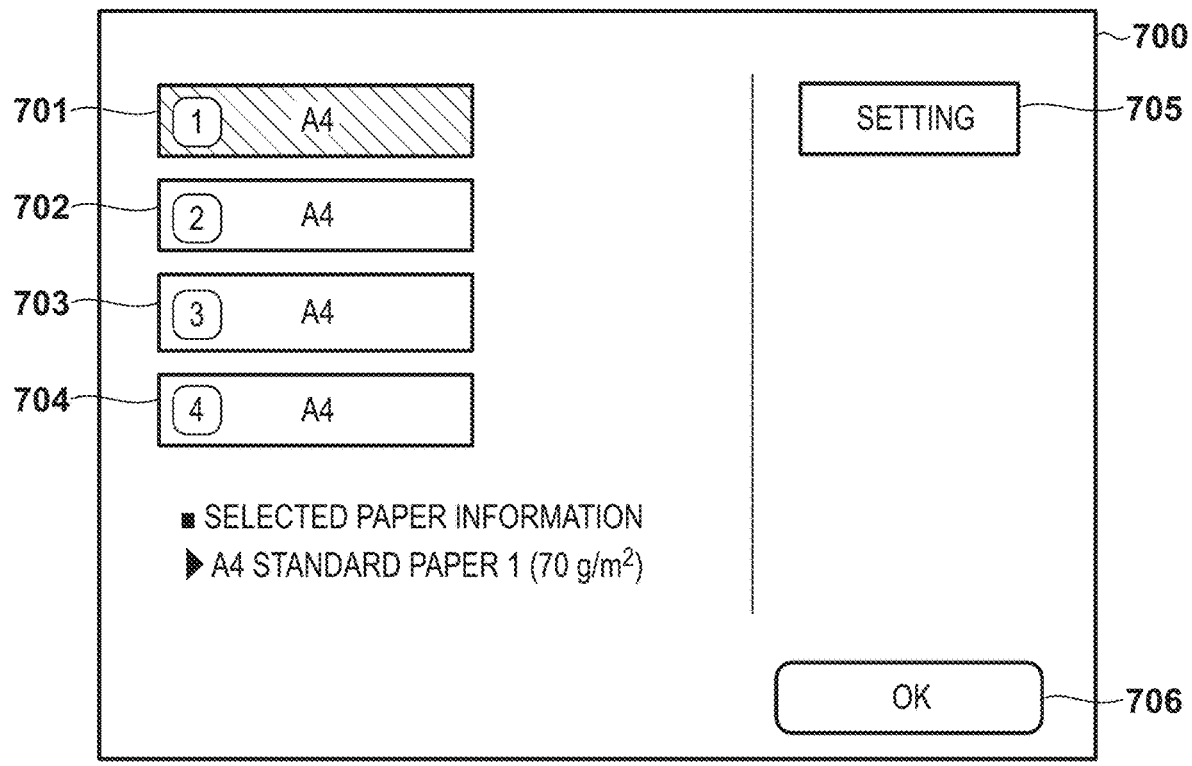
FIGS. 7A and 7B are screen transition diagrams illustrating paper replacement screens.
Figure 7B:
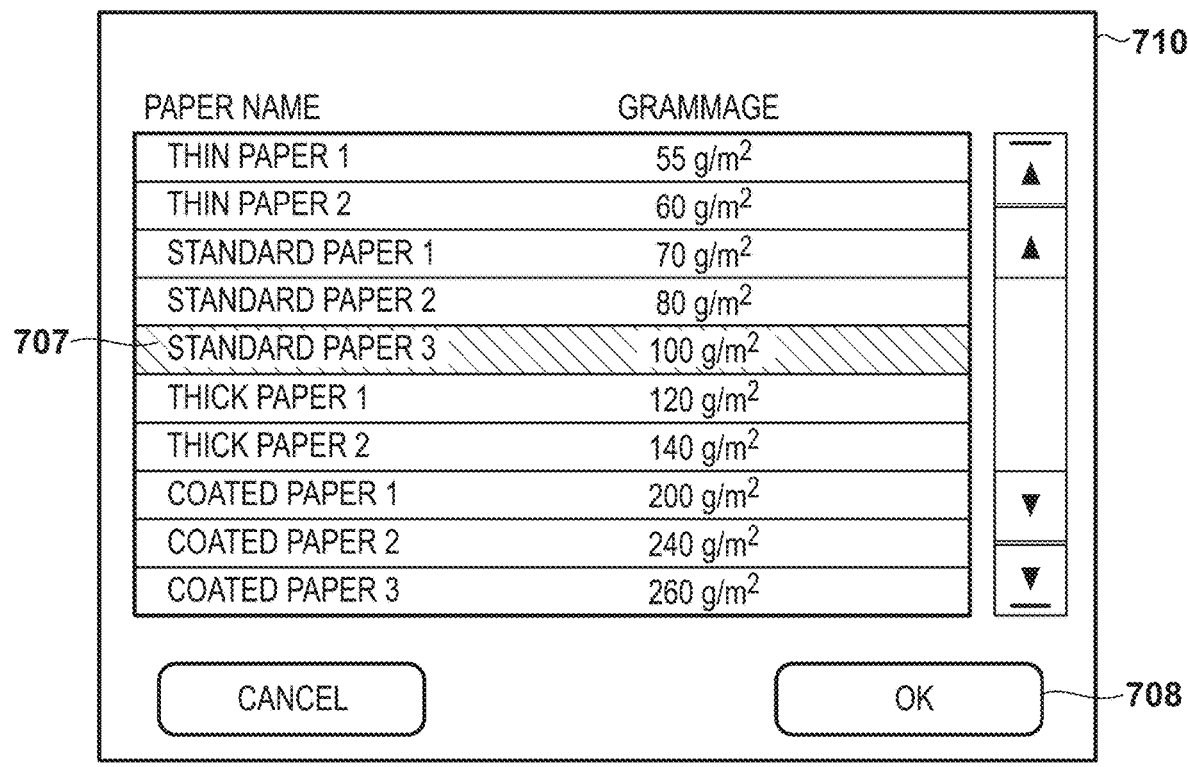

In S5001, the user operates a UI screen of the image forming apparatus 103 and selects a paper feed stage settings screen. In S5002, upon accepting an operation from the user, the UI control unit 336 of the image forming apparatus 103 obtains, from the paper feed stage management unit 333, information on the size and type of paper set in all the paper feed stages provided in the image forming apparatus 103. In S5003, the UI control unit 336 displays the information obtained in S5002 in the UI screen. FIG. 7A illustrates an example of the screen. In S5004, the user selects the paper feed stage for which the paper is to be changed from the UI screen of the image forming apparatus 103. In S5005, upon accepting an operation from the user, the UI control unit 336 of the image processing apparatus 101 displays a list of paper types that can be set for the selected paper feed stage on the UI screen. FIG. 7B illustrates an example of the screen.

In S5006, the user selects the paper type to be changed from the UI screen of the image forming apparatus 103. In S5007, upon accepting an operation from the user, the UI control unit 336 of the image forming apparatus 103 requests the paper feed stage management unit 333 to register the paper feed stage and paper type selected by the user. In S5008, the paper feed stage management unit 333 updates the information stored in the reference information storage unit 331 and the correction information storage unit 330. A detailed flow will be described later with reference to FIG. 6A.

Figure 6A:
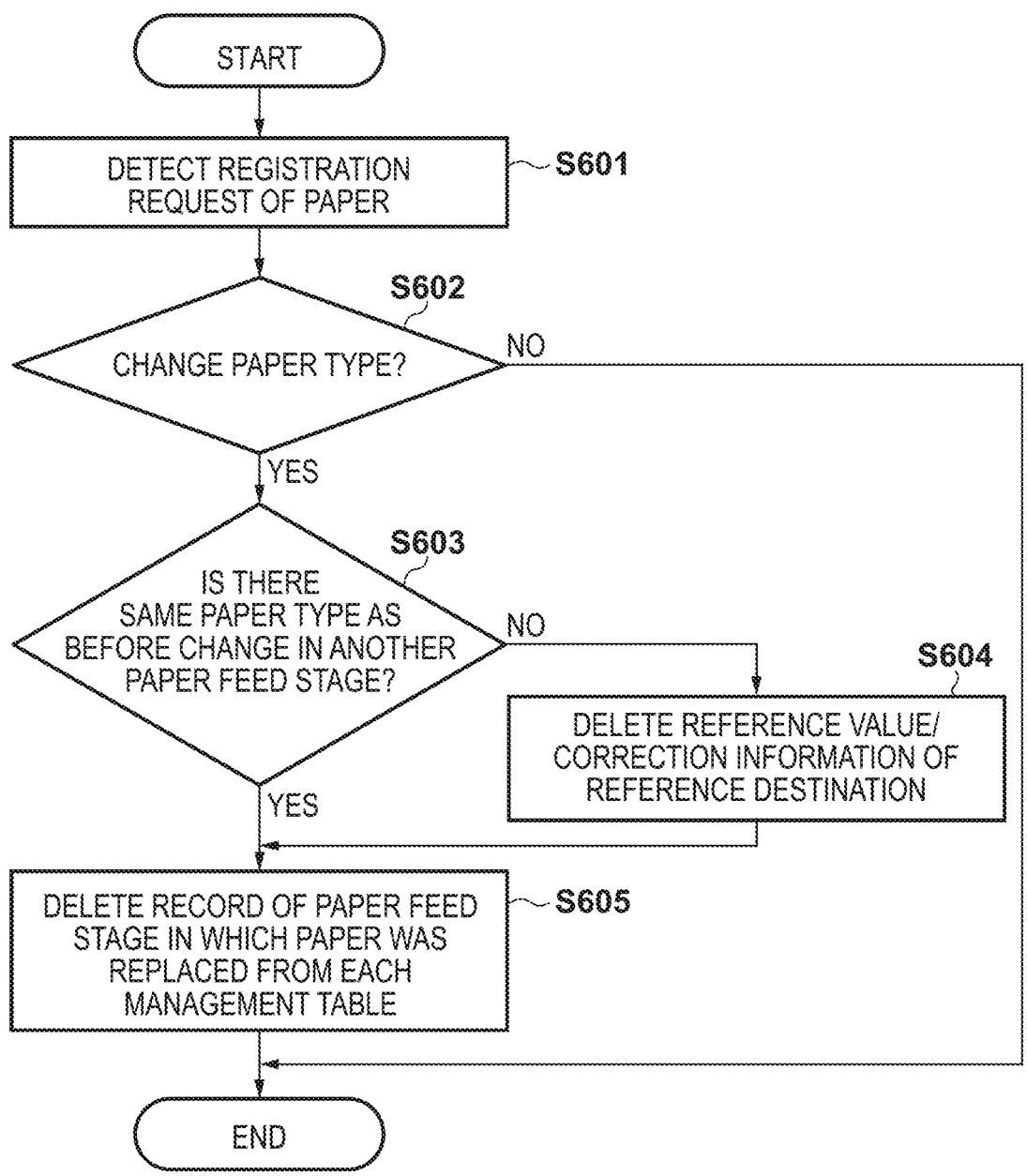
FIG. 6A is a flowchart illustrating the reference value/correction value registration/deletion processing.

If the paper feed stage management unit 333 determines that it is necessary to clear the reference information and the correction information on the basis of the flowchart in FIG. 6A, clearing processing is performed in S5009 and S5010. In S5009, the paper feed stage management unit 333 clears the reference information for the paper type to be removed for replacement that had been stored in the reference information storage unit 331. In addition, in S5010, the paper feed stage management unit 333 determines whether there is correction information for the paper type to be removed for replacement in the correction information storage unit 330, and if so, clears the correction information. After the series of processing in S5008 is completed, the paper feed stage management unit 333 performs registration processing for the paper type specified by the user in S5011. In the registration processing, the information on the paper type that is set in the selected paper feed stage is updated. Then, in S5012, the UI control unit 336 is notified that the registration is complete, and in S5013, the UI control unit 336 updates the UI screen with the information on the paper type for which registration is complete.

Figure 6B:
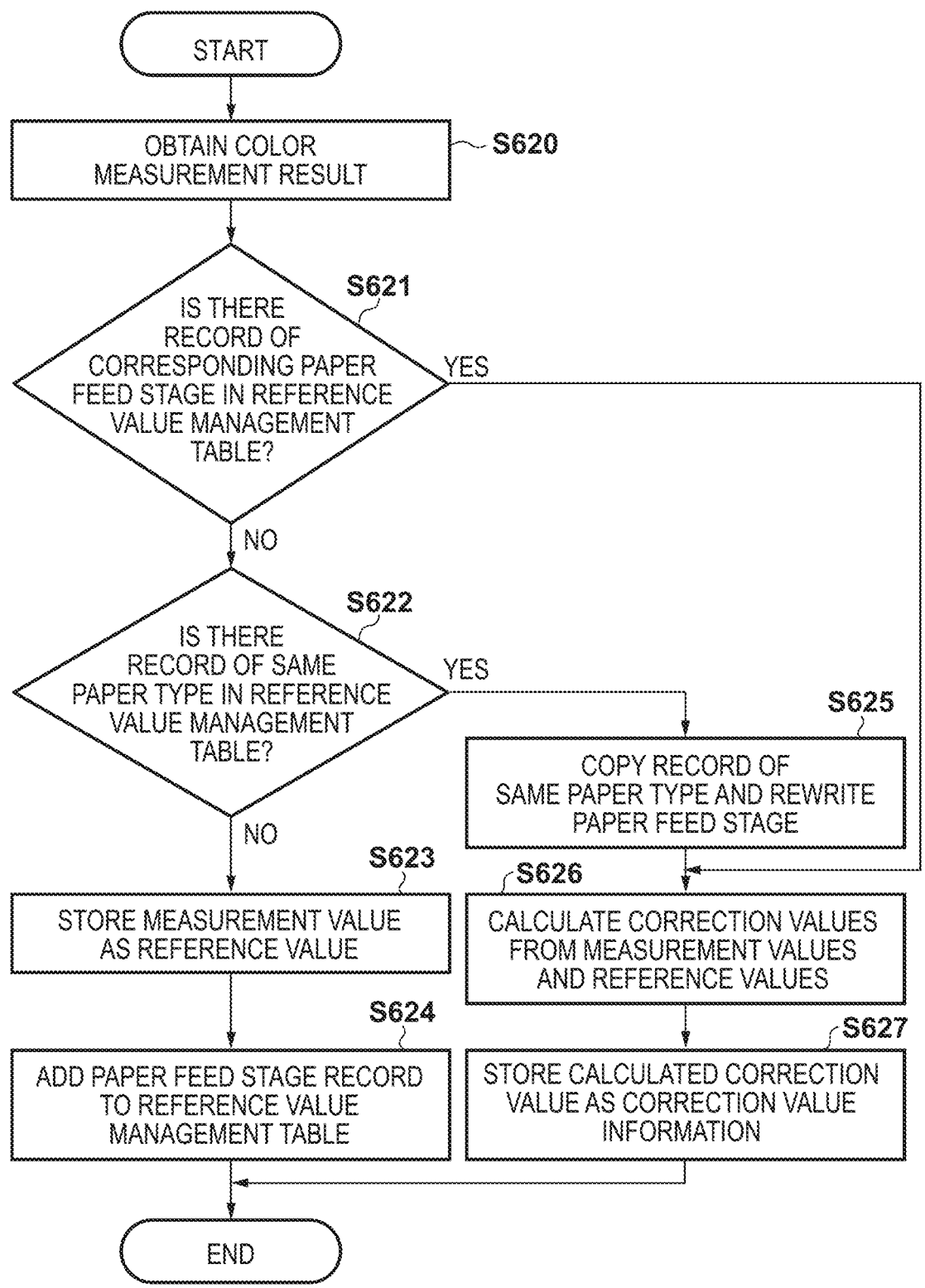
FIG. 6B is a flowchart illustrating the reference value/correction value registration/deletion processing.

FIGS. 6A and 6B illustrate a processing flow involved in changing the paper type registered in each paper feed stage of the image forming apparatus 103.

Clearing of Reference Information and Correction Information

FIG. 6A will be described first. FIG. 6A is a flowchart illustrating a method for clearing the reference information and the correction information for each paper type registered in the paper feed stage. This sequence is realized by the CPU 2101 of the image forming apparatus 103 reading out a program stored in the ROM 2102 into the RAM 2103 and executing the program. The paper information set in each paper feed stage is recorded in the RAM 2103, and on the basis of a paper change instruction from the UI control unit 336, the paper feed stage management unit 333 accesses the RAM 2103 and updates the paper information set in each paper feed stage. This flow starts when the UI control unit 336 receives a notification that the screen illustrated in FIG. 7A has been opened by the user.

When the paper feed stage management unit 333 receives, from the UI control unit 336, an indication that the user has selected a paper feed stage in the screen illustrated in FIG. 7A, selected a paper type in the screen illustrated in FIG. 7B, and pressed an OK button 708, the processing moves from step S601 to step S602.

In step S602, the paper feed stage management unit 333 accesses the RAM 2103 and determines whether or not there is a paper feed stage in which the paper type has been updated. If there is no paper feed stage in which the paper type has been updated, the processing ends. For example, assume that the paper type for a paper feed stage "1" is changed from "standard paper 1" to "standard paper 3". The paper feed stage management unit 333 detects this paper type change, and the processing moves to step S603. In step S603, the paper feed stage management unit 333 accesses the RAM 2103 and determines whether paper of the same type as the paper that was set in the paper feed stage subject to the paper change is set in another paper feed stage. If there is paper of the same type in another paper feed stage, the processing moves to step S605. However, if there is no paper of the same type in another paper feed stage, the processing moves to step S604.

Because the paper type from before the change will no longer be used in all paper feed stages, in step S604, the paper feed stage management unit 333 instructs the reference information storage unit 331 and the correction information storage unit 330, which manage the reference value/correction value information for the paper in question, to delete the reference value/correction value information. This process corresponds to S5009 and S5010 in FIG. 5. The reference value/correction value information corresponds to TBL881A and TBL883A, which will be described later. The processing then moves to step S605. In step S605, the paper feed stage management unit 333 instructs the reference information storage unit 331 and the correction information storage unit 330 to delete the paper type information of the paper feed stage subject to the setting changes from a reference value management table (FIG. 8D1) and a correction value management table (FIG. 8D2), on a record-by-record basis. The processing then ends.

Reference Information and Correction Information Registration

FIG. 6B will be described next. FIG. 6B is a flowchart illustrating a method for registering the reference information and the correction information for each paper type. This procedure corresponds to S4035 to S4039 in FIG. 4A-3. The reference information storage unit 331 holds reference values (TBL881A in FIG. 8C, described later) in the RAM 2103. The correction information storage unit 330 holds measurement values (TBL882A, described later) in the RAM 2103. A table (TBL883A, described later) holding correction values from the measurement values and the reference values is also held in the RAM 2103. This sequence is realized by the CPU 2101 of the image forming apparatus 103 reading out a program stored in the ROM 2102 into the RAM 2103 and executing the program. This flow begins when the reference information storage unit 331 receives a notification of the color measurement result from the colorimetric sensor control unit 332.

In step S620, the reference information storage unit 331 records the obtained color measurement result in the measurement value TBL882A in the RAM 2103. Then, the paper feed stage number where the color measurement result was obtained is associated and stored in the RAM 2103. The processing then moves to step S621. In step S621, the reference information storage unit 331 accesses the RAM 2103 and determines whether the paper feed stage number associated with the color measurement result communicated by the colorimetric sensor control unit 332 is registered as a record in a target paper feed stage 892 in the reference value management table (FIG. 8D1). If the number is not registered, the processing moves to step S622. However, if the number is registered, the processing moves to step S626. The case where the processing moves to step S622 will be described first.

In step S622, the reference information storage unit 331 accesses the reference value management table (FIG. 8D1), and determines whether a paper type associated with the color measurement result communicated by the colorimetric sensor control unit 332 is registered in another paper feed stage. If the paper type is not registered in another paper feed stage, the processing moves to step S623. If the paper type is registered in another paper feed stage, the processing moves to step S625. The case where the processing moves to step S623 will be described first.

In step S623, the reference information storage unit 331 saves the color measurement result communicated by the colorimetric sensor control unit 332 as reference values (TBL881A, described later). The processing then moves to step S624. In step S624, the reference information storage unit 331 adds, to the reference value management table (FIG. 8D1), a record of the paper feed stage associated with the color measurement result communicated by the colorimetric sensor control unit 332, and finishes link processing referring to the reference values saved in step S623. Specifically, when the table referenced by the reference values for the paper type "standard paper 3" is the TBL881A, the paper type "standard paper 3" is entered in a paper type column 891 of the reference value management table (FIG. 8D1). Furthermore, "TBL881A with (link)", which is link information for the reference value, is entered in a reference value column 894. The processing then ends.

On the other hand, if in step S622 the paper type is registered in another paper feed stage, the processing moves to step S625. In step S625, the reference information storage unit 331 copies the record of the same paper type already registered in the reference value management table (FIG. 8D1) to the reference value management table (FIG. 8D1) as a record of the paper feed stage associated with the color measurement result. Note, however, that all fields aside from a target paper feed stage column 892 are copied. Information specifying the designated paper feed stage is stored in the target paper feed stage column 892. The reference values for the paper type of the designated paper feed stage are saved as a result. The processing then moves to step S626. The processing also branches to step S626 when, in step S621, the paper feed stage number associated with the color measurement result is registered as a record in the target paper feed stage 892 of the reference value management table.

In step S626, the reference information storage unit 331 calculates the correction values from the measurement values (TBL882A, described later) and the reference values (TBL881A, described later). The correction values are obtained, for example, by subtracting the measurement values of the corresponding patch from the reference values of specific densities of a specific color. The processing then moves to step S627. In step S627, the reference information storage unit 331 notifies the correction information storage unit 330 of the result of the calculation performed in step S626. In response to this notification, the correction information storage unit 330 saves the values in the correction values (TBL883A, described later). The processing then ends.

Paper Type Registration Screen

The screens for registering the paper type in the paper feed stage of the image forming apparatus 103, illustrated in FIGS. 7A and 7B, will be described according to the sequence illustrated in FIG. 5. FIG. 7A illustrates the paper feed stage settings screen displayed by the UI control unit 336. When the user calls the paper feed stage settings screen (S5001), the UI control unit 336 queries the paper feed stage management unit 333 for the current paper feed stage settings information (S5002), and displays a result thereof in a screen 700 (S5003).

The user selects the paper feed stage for which the paper type is to be set in the screen 700. In the present embodiment, select buttons 701 to 704 are assigned to four paper feed stages. After selecting a specific paper feed stage, the user presses a set button 705 for setting the paper type (S5004), and calls a paper type selection screen 710 illustrated in FIG. 7B (S5005).

In the paper type selection screen 710, the user selects one paper type that matches the paper type loaded/to be loaded in the paper feed stage selected in the screen 700. In the example in FIG. 7B, standard paper 1 is replaced with standard paper 3 (S5006). The screen returns to the screen 700 when the OK button 708 is pressed. In the screen 700, the user confirms that the paper type has been successfully changed, and presses an OK button 706. The UI control unit 336 notifies the paper feed stage management unit 333 of the user's settings (S5007), and makes a registration request (S5008).

Holding Correction Values and Reference Values

Printing positions of the tone correction mark information for tone correction (the tone patches), the colorimetric sensor that measures the printed color patches, and a method for holding signal values from the colorimetric sensor and correction values derived from the signal values, according to the present embodiment, will be described next. The descriptions will refer to FIGS. 8A, 8B, 8C, 8D1, 8D2, 8E1 to 8E3, 8F1 to 8F3, and 8G1 to 8G3.

FIG. 8A will be described first. 800 indicates an example of the output of the tone correction mark information (the tone patch) for the purpose of real-time tone correction according to the present embodiment. The patches required for real-time multitone correction are printed in a margin area defined inside print paper 800 and outside a guaranteed printing region 801 of the paper. The guaranteed printing region is a part serving as the final product, and is a region where the user image is guaranteed to be printed. On the other hand, although there are areas outside the guaranteed printing region where images can be formed, those areas are assumed to be cut and removed for the final product. Therefore, in POD machines, the outside of the guaranteed printing region is used to print various types of patches necessary for image quality adjustment, information necessary for inspection, and the like.

The patches for real-time tone correction in the present embodiment are printed side-by-side outside the guaranteed printing region, and those patches are read by colorimetric sensors 861 and 862 on the printed surface side. Accordingly, the patches of each color are aligned parallel to the transport direction in accordance with the positions of the colorimetric sensors. A total of 40 patches are printed on the print paper 800, namely 10 patches of a cyan tone patch 810, 10 patches of a magenta tone patch 850, 10 patches of a yellow tone patch 830, and 10 patches of a black tone patch 840, in 10% density increments for each single color of toner. For example, a cyan color patch 820 has a density of 100%, and thereafter, the density decreases in 10% increments, resulting in a patch 829 having a density of 10%. Each of the magenta, yellow, and black colors are also constituted by 10 patches in one set, basically using the reference value/measurement value data for the four colors to generate feedback information necessary for tone correction. The tone correction patches are composited by the patch compositing unit 309 with the image generated by the image generating unit 307.

Additionally, in the present embodiment, a tone patch can be printed only for the toner colors to be used on the page. For example, if only cyan toner is used on a given page, 10 patches of cyan are printed in 10% density increments as the tone patch 810. Because the tone patches 830, 840, and 850 are toner colors that are not used, control is performed so as not to print patches of these colors.

Additionally, in the present embodiment, an area where toner colors not used were expected to be printed may be used to switch to finer density differences, reference values, and measurement values for each of the tone patches to be used, in order to increase the feedback information required for tone correction. Doing so makes more detailed correction possible. For example, if only cyan toner is used on a page, printing the tone patch 810 of only cyan, which is the color to be used, will result in the regions of the tone patches 830, 840, and 850 being blank regions. In the present embodiment, these regions are also printed with tone patches for cyan, which is used on the page. Note that in the present specification, "tone" is sometimes written as "gradation", but both indicate stages of shading and are therefore synonymous.

Specifically, in this case, the only toner color to be used is cyan, and thus a cyan tone patch is generated by breaking the density down into 40 levels. The tone patch broken down into 40 levels of density values is then divided into, for example, four patches of 10 levels each, and the patches are printed in the regions of the tone patches 810, 830, 840, and 850, respectively. At this time, the reference values and the measurement values are also broken down into 40 levels. Doing so makes it possible to perform finer gradation correction than when the gradation correction is performed in 10 levels.

Figures 8B, 8C:
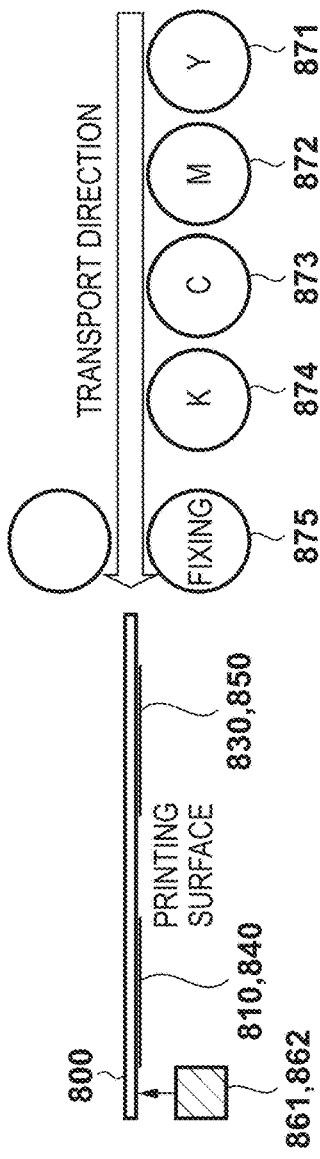
FIG. 8B illustrates a position of the sensor relative to a transport direction of a printed document and a printed surface.
FIG. 8C illustrates a sample of reference values, measurement values, and correction values for tone correction (in 10 levels).

FIG. 8B will be described next. FIG. 8B is a cross-sectional view of a transport path in the image forming apparatus illustrated in FIG. 8A, viewed from the side. After the toner is transferred onto the print paper 800 by developers 871 to 874 for the respective CMYK colors and fixed by a fixer 875, the tone patches 810, 830, 840, and 850 are read by the colorimetric sensors 861 and 862 installed at both left and right ends in the transport direction. The colorimetric sensors are installed on the printing surface side. Because the position of the tone patch varies depending on the size of the paper, the colorimetric sensors may be disposed for each size, and the colorimetric sensors used may be changed according to the size of the paper being transported, or the colorimetric sensors may be configured to be movable according to the paper size.

Reference Values, Measurement Values, and Correction Values

FIG. 8C is an example of the reference values, the measurement values, and the correction values generated on the basis of the CMYK density information scanned by the colorimetric sensors 861 and 862. The reference values are standard values for determining CMYK density information. The measurement values are values generated on the basis of the reference values, and indicate the density of the patch printed on the paper when read by the colorimetric sensors. The correction values are values calculated by finding a difference between the reference values and the colorimetric values. As illustrated in FIG. 8A, 10 patches for each CMKY color, for a total of 40 patches, are printed on the print paper 800, and thus 40 measurement values are obtained when the patches are read by the colorimetric sensors. In the present embodiment, the colorimetric sensor control unit 332 quantifies and stores the patch density of the colorimetric sensor in 1024 levels.

The color measurement result communicated by the colorimetric sensor control unit 332 are held, in the reference information storage unit 331, as reference values for each paper type set in the paper feed stage. It is necessary to manage the color measurement results for each paper type. If the color measurement result of the paper communicated by the colorimetric sensor control unit 332 is for paper not yet registered in the reference information storage unit 331, color measurement results for 40 points are stored as new "reference values" 881A. If the color measurement result of the paper communicated by the colorimetric sensor control unit 332 is for paper already registered in the reference information storage unit 331, the color measurement result is treated as new "measurement values" 882A, and correction values 883A are calculated from differences between the reference values and the measurement values. The correction values are stored in the correction information storage unit 330. Although the correction values are stored in the present embodiment, the measurement values may be stored and the correction values may then be calculated each time from the differences between the reference values and the measurement values.

Note that FIG. 8C illustrates an example when all the CMYK patches are printed. As described earlier, when printing patches of only the toner color used on a page and printing patches of the same color in a plurality of locations, patches with a density set even finer than 10% are used. FIGS. 8E1 to 8E3 are examples of the reference values, the measurement values, and the correction values used when printing patches of the same color in two locations. In this case, the densities of the patches to be printed in the two locations are generated in 20 levels and printed, after which gradation correction is performed. FIGS. 8F1 to 8F3 and FIGS. 8G1 to 8G3 are examples of the reference values, the measurement values, and the correction values used when printing patches of the same color in three locations and four locations, respectively.

Correction Value Management Table and Reference Value Management Table

FIG. 8D1 is the reference value management table through which the reference information storage unit 331 manages the reference values. The record information is constituted by the following items: the paper type 891, the target paper feed stage 892, a reference value (1/2 speed) 893, a reference value (1/1 speed) 894, a generated Page ID 895, and a Timestamp 896.

FIG. 8D1 illustrates an example of a case where plain paper 3 is loaded in paper feed stage 1, and later, in the printing processing for page number 60014 after the power has been turned on at 10:04:06 on 2019/07/18, "standard paper 3" is fed from "paper feed stage 1" at "1/1 speed". In other words, this is an example of registering the printing results of this case as color measurement/reference values. Rather than reference values themselves, links to the reference value and correction value tables are registered in the reference values 893 and 894. When "standard paper 3" is removed from "paper feed stage 1", the record information is deleted.

FIG. 8D2 illustrates the correction value management table through which the correction information storage unit 330 manages correction values. The basic structure of the table is identical to the reference value management table, except that the reference values have been replaced with correction values. When the paper in question is removed from a target paper feed stage 897, the record information is deleted.

Job Attribute Settings Screen

Figure 9:
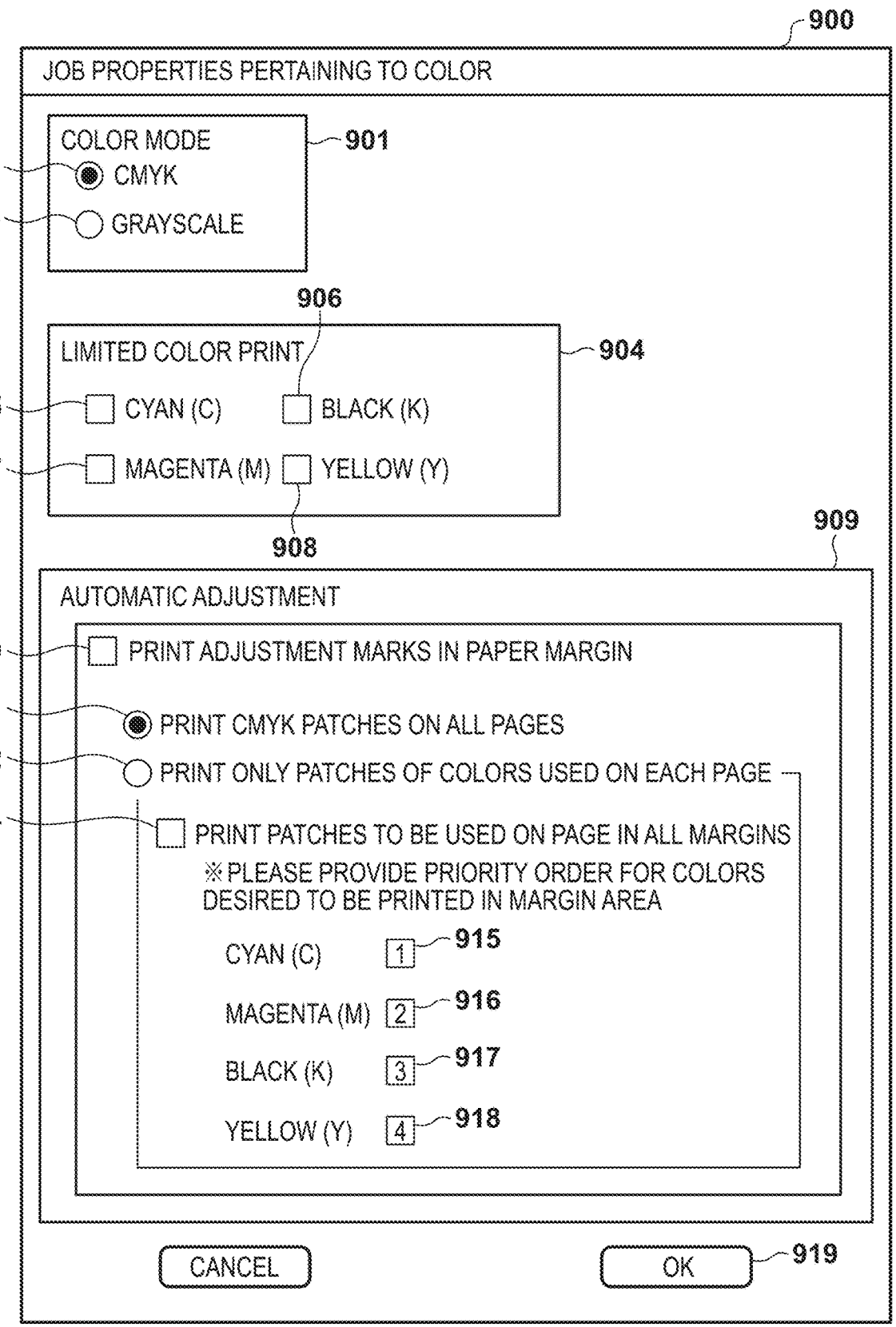
FIG. 9 illustrates an example of a screen for specifying job properties pertaining to color.

FIG. 9 illustrates a screen (UI) for setting job attributes for a print job. This UI is displayed in the operation unit 2206 by the CPU 2201 reading a program stored in the ROM 2202 and making an instruction to the operation panel I/F 2205. The user operates the operation unit 2206, selects the executed job, and displays a UI 900 in the operation unit. Each attribute is described below.

A color mode selection part 901 is a part in which the color mode is designated. CMYK 902 indicates that the print job image will be processed using all the CMYK colors. Grayscale 903 indicates that the print job image will be processed using K toner.

A color designation part 904 is a part through which the colors to be used are designated and instructions for processing the print job are made. For example, if the user checks the box for 905, the print image will be processed to be printed using only cyan toner. In this manner, the user can designate the colors to be used on a job-by-job basis. During RIP processing, the designated colors are referenced and the raster image is generated using only the designated colors.

A patch setting part 909 is a part for designating the tone patches to be used for automatic adjustment. When the user selects an adjustment mark designation 910, patch reading and correction processing is executed for the print job by the image forming apparatus. The adjustment mark is the same as the tone patch. When the user selects all colors designated 911, patches of each of the CMYK colors are printed on all pages generated through the print job processing. When the user selects used color designation 912, only the colors used on each page processed in the print job are printed as correction patches. Full margin designation 914 specifies that if there are one or more CMYK toner colors not used when used color designation 912 is selected, a patch of the color used on the page will be printed in the area where the unused color would originally be printed.

Additionally, priority color designations 915 to 918 designate which color used on the page will be printed as a patch with priority if there are the aforementioned toner colors. When CMYK 902 is selected in the color mode selection part 901, and one of cyan 905 to yellow 908 is selected in the color designation part 904, only the color selected in the color designation part 904 can be specified in the priority color designations 915 to 918. For example, assume the user selects CMYK 902, cyan 905, the adjustment mark designation 910, the used color designation 912, and the full margin designation 914, and enters a "1" only for cyan 915 among cyan 915 to yellow 918. In this case, the only toner used on the page will be cyan. In other words, yellow, black, and magenta are not printed in the tone patches 830, 840, and 850, respectively, in FIG. 8A. In this case, the patches illustrated in FIGS. 8G1 to 8G3, which are set to 40 levels of density, are divided into 10 levels each and printed in four locations. The patch selection and layout methods will be described below.

When the user selects an OK button 919, the UI control unit 308 detects the button being pressed, writes the designated job attributes into the RAM 2203, and ends the processing.

Print Job

The print job used in the present embodiment will be described next. FIG. 10A illustrates a job storage table. A job storage table 1001 is stored in the RAM 2203, for example. The print jobs are sent from the information processing apparatus 102. When the user instructs a print job to be generated and executed in the image processing apparatus 101, the print job generating unit 301 receives that instruction and records a printing order and a print job name in the job storage table 1001 in the order of reception.

FIG. 10B illustrates a job attribute table. A job attribute table 1002 is stored in the RAM 2203, for example. Upon receiving an indication that a print job has been registered from the print job generating unit 301, the job control unit 303 reads the attributes designated in the job, and writes the attributes into the job attribute table 1002. The content written in each column of the job attribute table 1002 is as follows.

Column [1]: job name.
Column [2]: color mode (based on the designation in the color mode selection part 901 in FIG. 9).
Column [3]: designated color (based on the designation in the color designation part 904).
Column [4]: whether or not automatic adjustment is performed (based on the designation in adjustment mark designation 910).
Column [5]: patch mark printing method (based on the designation in all colors designated 911 or used color designation 912).
Column [6]: whether there is a designation to print patches to be used on the page in the margin area (based on full margin designation 914).
Columns [7] to [10]: based on the designations in cyan 915 to yellow 918. These are active only when "yes" is indicated in column [6].

The above-described job attributes may be sent to the image processing apparatus 101 (in the case of FIG. 4A) or further sent to the image forming apparatus 103 (in the case of FIG. 4B), and referenced in order to generate patch arrangement tables, illustrated in FIGS. 11A to 11G.

Example of Arrangement of Tone Patch

FIGS. 11A to 11G are patch arrangement tables indicating the used toner colors for each page in a print job and examples of which types of patches are printed in each patch printing area. Each table is stored in the RAM 2203, for example. These tables may be generated by the print job generating unit 301, or may be generated by the page control unit 304 or the page control unit 324. These tables may be generated on the basis of the colors of each page and the job attributes, and may be referred to in the patch type determination and patch compositing.

The content written in each column of each table is as follows.

Column [1]: page number.
Column [2]: used toner color.
Column [3]: patch type to be printed in area 1 (810) (default patch color: C).
Column [4]: patch type to be printed in area 2 (830) (default patch color: Y).
Column [5]: patch type to be printed in area 3 (840) (default patch color: K).
Column [6]: patch type to be printed in area 4 (850) (default patch color: M).

Note that default patch colors are defined for the colors of the patches to be printed in columns [3] to [6]. The default patch colors are as described above. The method for determining the patch type will be described with reference to the flowchart in FIG. 12. The patch types used will be described here. As described with reference to FIG. 8C, in the present embodiment, the type of patch to be printed is switched according to the number of areas where patches of the same color are printed. In FIGS. 11A to 11G, each cell indicates the color and the number of tones in the tone patch. The color is indicated by the initial letter of the color, and the number of tones is indicated by the values in the tens place.

For example, if patches of the same color are to be printed in two locations, the density of the patches to be used is generated in 20 levels. For example, when using a patch for magenta generated with 20 levels of patch density, "M2" is entered in the cell indicating the area to be printed in the tables illustrated in FIGS. 11A to 11G (e.g., [b][5] and [b][6] in table 1104).

Additionally, when using a patch for cyan generated with 30 levels of patch density, "C3" is entered in the tables illustrated in FIGS. 11A to 11G (e.g., [a][3] to [a][5] in table 1105). Furthermore, when using a patch for black generated with 40 levels of patch density, "K4" is entered in the tables illustrated in FIGS. 11A to 11G (e.g., [a][3] to [a][6] in table 1107). Additionally, when using a patch for yellow generated with 10 levels of patch density, "Y1" is entered in the tables illustrated in FIGS. 11A to 11G (e.g., [c][6] in table 1104). Of course, these notations are for descriptive purposes only, and may actually be the corresponding unique codes.

In this manner, for colors where tone patches are composited in a plurality of regions, when a tone patch is composited in one region, a tone patch with a number of tones corresponding to (proportional to) the number of regions is divided by the number of regions and each resulting patch is arranged in a corresponding region.

Processing for Determining Placement of Patches on Page

Figure 12:
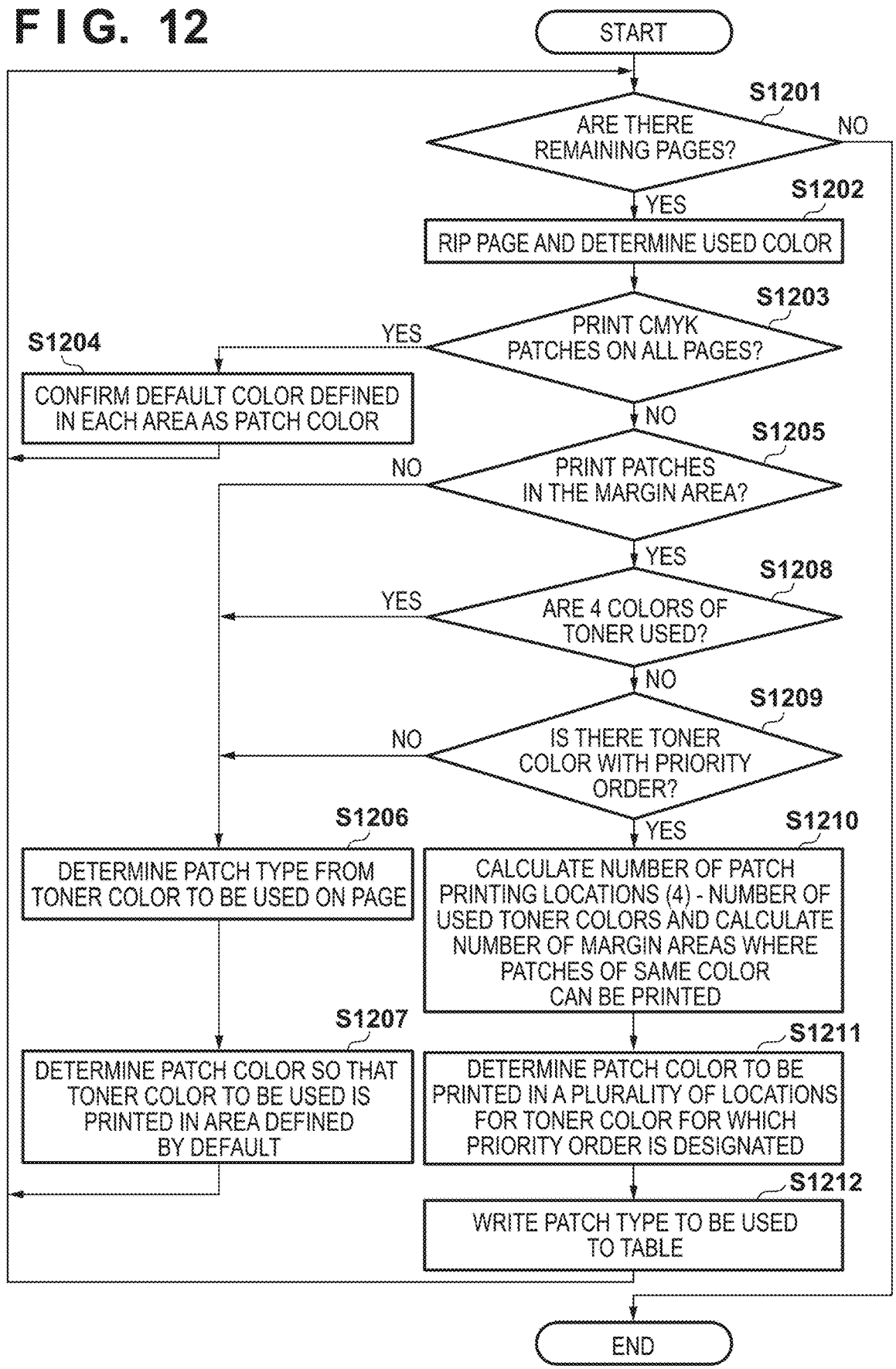
FIG. 12 is a flowchart illustrating the determination of a patch layout.

FIG. 12 is a flowchart illustrating the determination of the types of patches described with reference to FIGS. 11A to 11G (patch types based on the patch color and density levels) and the layout thereof. Each step in the flowchart illustrated in FIG. 12 is realized by the CPU 2201 reading out a program stored in the ROM 2202. The processing of FIG. 12 corresponds to the details of the processing from S4004 to S4008 in FIG. 4A-1, or from S4004 to S4059 in FIG. 4B. The letter "S" in the description of each process indicates a step in the flowchart. The processing in FIG. 12 focuses on the print jobs stored in the job storage table 1001 illustrated in FIG. 10A in sequence according to the printing order, and is executed for the print job being focused on (called a "job of interest" or a "target job"). The patch arrangement tables illustrated in FIGS. 11A to 11G are created through this processing.

First, it is determined whether or not "automatic settings", included in the job attributes of the job of interest, is designated. This is done, for example, by determining whether or not the value in the "automatic settings" field of the job attribute table 1002 in FIG. 10B is "yes". If automatic settings are not designated, the tone patch will not be printed on each page, and thus the sequence in FIG. 12 need not be executed. However, if "yes" is set, the job control unit 303 instructs the page control unit 304 to start the page processing, whereupon the flow illustrated in FIG. 12 starts. At the start of FIG. 12, the first page of the job of interest is focused on. This will be called a "page of interest" or a "target page".

In step S1201, the page control unit 304 determines whether there are any unprocessed pages remaining. The processing ends if there are no unprocessed pages. However, if there is an unprocessed page in step S1201, the processing moves to step S1202, taking the first of the unprocessed pages as the page of interest. In step S1202, the RIP control unit 306 create a raster image from the page and determines the toner colors to be used for the page of interest. The toner colors to be used are then recorded in the used toner color column of the patch arrangement tables illustrated in FIGS. 11A to 11G. The processing then moves to step S1203.

In step S1203, the page control unit 304 instructs the patch type determination unit 310 to determine the patch type to be used. The patch type determination unit 310 accesses the mark printing method in the job attribute table 1002 and determines whether "CMYK patch printing on all pages" is selected. If this item is selected, the processing moves to step S1204. However, if this item is not selected, the processing moves to step S1205.

In step S1204, the patch type determination unit 310 instructs the printing of patches generated with 10 levels of density for the colors defined as default colors for each area where the tone patches are to be printed (C1, Y1, K1, and M1). Specifically, the signs C1, Y1, K1, and M1, which indicate the color and the tone, are written as the patch type for each area in the patch arrangement table. The processing then moves to step S1201.

In step S1205, the "patch printing in margin area" column of the job attribute table 1002 is accessed, and it is determined whether or not this item is set. The processing branches to step S1206 if not set, and to step S1208 if set.

In step S1206, the patch type determination unit 310 accesses a used toner color column (written in step S1202) in the patch arrangement tables illustrated in FIGS. 11A to 11G. The used toner color is then recorded into the RAM 2203. The processing then moves to step S1207. In step S1207, the patch type determination unit 310 accesses the RAM 2203 and reads out the toner color to be used in the patch printing. Then, according to the number of colors, the sign corresponding to the color to be used among C1, Y1, K1, and M1 is recorded in the column of the area corresponding to the color to be used among the default areas of C, Y, K, and M in the patch arrangement table 1102. Here, in step S1207, the patch type to be determined is a tone patch having 10 density levels for all of the colors. The processing then branches to step S1201.

If the setting for printing patches in the margin area is active, in step S1208, it is determined whether the colors used in the page of interest are the four CMYK colors. If it is determined that the colors to be used are the four colors, the tone patches of each color are composited in the default areas, after which the processing branches to step S1206. However, if it is determined that the colors to be used are not the four colors, the processing branches to step S1209. Note that the processing may branch to step S1204 if it is determined in step S1208 that the toner to be used is four colors.

In step S1209, the patch type determination unit 310 accesses the patch printing priority order in the job attribute table 1002 to determine whether or not a setting is active. If a setting is active, the processing branches to step S1210. A case where no priority order setting is active is treated the same way as a case where the setting to print patches in the margin area is not active, and the processing branches to step S1206.

If the priority order is set, in step S1210, the patch type determination unit 310 accesses the patch arrangement table, obtains the number of used toner colors, and subtracts that value from "4", which is the number of areas where patches can be printed. That value, i.e., the number of margin areas where patches of the same color can be printed, is recorded into the RAM 2203, and is used to determine whether the number of toner colors is lower than the number of regions. Processing then moves to step S1211. In step S1211, the patch type determination unit 310 determines the color of the color patch to be used, which is also recorded into the RAM 2203. In step S1211, the toner color that has been designated in the priority order and that is used on the page is determined as the color of the tone patch to be arranged in the margin area.

In step S1212, the patch type determination unit 310 records the arrangement of the tone patches in the patch arrangement tables in FIGS. 11A to 11G by referring to the number of margin areas and colors recorded in the RAM 2203 in steps S1210 and S1211, respectively. In step S1212, the tone patches of the colors for which the priority order is designated are arranged in the number of available areas determined in S1210, according to the priority order. First, the tone patches of the colors to be used for which no priority order is designated are arranged in the default areas with 10 density levels. The colors of the available areas are then determined according to the priority order. The order of the areas can also be determined in advance, for example, to determine which color goes in which area. An available area may be selected according to the predetermined order, and for the selected available area, the color of the tone patch to be arranged may be determined according to the designated priority order. The color of an available area may be determined, for example, by writing the sign of the corresponding color in the column for the available area in the patch arrangement table. If an available area remains after determining the areas for arrangement for all the colors for which the priority order is designated, the determination of the areas for arrangement is repeated, returning to the color highest in the priority order. Once the colors have been determined for all available areas, the number of areas where each color will be arranged is counted. The number of areas counted is the position in the tens place in the density levels of the tone patch for the color arranged in that area. Therefore, that number is additionally recorded immediately after the color sign (Y, M, C, K) that has been recorded in the patch arrangement table. The patch arrangement table is completed as a result.

Specific examples will be described next with reference to the job attribute table 1002 illustrated in FIG. 10B and the patch arrangement tables illustrated in FIGS. 11A to 11G.

Processing of Job 1

The job control unit 303 processes the jobs registered by the print job generating unit 301 in the order written in a table 1001. The processing of the print job name "Job 1" with a printing order of "1", written in the table 1001, is started. The PDL analyzing unit 305 is then instructed to write the job attributes designated in the job in row [a] of a table 1002. It is then confirmed that automatic adjustment is set to "yes" for [a][4]. The job control unit 303 then instructs the page control unit 304 to start the page processing, whereupon this flow starts.

In step S1201, the page control unit 304 confirms whether there are still pages to be processed. If there are no remaining pages, the processing ends. If there is a remaining page in step S1201, the processing moves to step S1202. In step S1202, the RIP control unit 306 RIPs the page and finalizes the used toner colors. Then, the used toner colors "C, M, Y, K" are written in the cell [a][2] of a table 1101. The processing then moves to step S1203. In step S1203, the page control unit 304 instructs the patch type determination unit 310 to determine the patch type to be used. The patch type determination unit 310 accesses [a][5] in the table 1002 and confirms that "CMYK patch printing on all pages" is selected. The processing then moves to step S1204.

In step S1204, the patch type determination unit 310 instructs the printing of patches generated with 10 levels of density for the colors defined as default colors in each area where the patches are to be printed (C1, Y1, K1, and M1). Specifically, these are written into [a][3] to [a][6], respective, in the table 1101. The processing then moves to step S1201. After this, the second page is processed, and the processing moves to steps S1202, S1203, and S1204. [a][5] of "Job 1" designates "CMYK patch printing on all pages", and thus patches generated with the colors defined as the default colors and with 10 levels of density (C1, Y1, K1, M1) are printed on each page. When there are no pages remaining in step S1201, the processing ends. Thereafter, an image composited with the patches is subjected to the correction processing illustrated in FIG. 8C by the color measurement unit 2110 of the image forming apparatus 103, but details thereof will not be described.

Processing of Job 2

Next, the job control unit 303 starts the processing of the print job name "Job 2" with a printing order of "2", written in the table 1001. The PDL analyzing unit 305 is then instructed to write the job attributes designated in the job in row [b] of a table 1002. It is then confirmed that automatic adjustment is set to "yes" for [b][4]. The job control unit 303 then instructs the page control unit 304 to start the page processing, whereupon this flow starts.

In step S1201, the page control unit 304 confirms whether there are still pages to be processed. Thereafter, the processing moves to steps S1201 and S1202, but the details thereof have already been described and will therefore be skipped here. In step S1202, the used toner color for page number "1" of "Job 2" is written as "C, M" in [a][2]. The processing then moves to step S1203. In step S1203, the page control unit 304 instructs the patch type determination unit 310 to determine the patch type to be used. The patch type determination unit 310 accesses [b][5] in the table 1002 and confirms that "CMYK patch printing on all pages" is designated. Because "print only patches of colors used on page" is written in [b][5] of the table 1002, the processing moves to step S1205.

In step S1205, the patch type determination unit 310 confirms [b][6] in the table 1002, and confirms the value for "patch printing in margin area". In this example, the value is "no", and the processing therefore moves to step S1206. In step S1206, the patch type determination unit 310 accesses [a][2] of the table 1102, confirms that the used toner colors are the two colors "C, M", and records, in the RAM 2203, an indication that the patches are to be printed in the two colors "C, M". The processing then moves to step S1207. In step S1207, the patch type determination unit 310 accesses the RAM 2203 and reads out the toner colors "C, M" to be used in the patch printing. These colors are then recorded in a table 1102 so that patches generated with 10 levels of density are printed in the areas defined as defaults.

Specifically, 810 indicates that the toner color to be used, "C", is defined as the default color. Accordingly, a patch "C1" having 10 levels of density is recorded in cell [a][3] of an area 1, where "C" is defined as the default color. Likewise, a patch "M1" having 10 levels of density is recorded in cell [a][6] of an area 4, where "M" is defined as the default color. The processing then moves to step S1201. Thereafter, the processing moves to steps S1201, S1202, S1203, S1205, S1206, S1207, and S1201, but the details thereof have already been described and will therefore be skipped here. In step S1201, the page control unit 304 ends the processing if there are no pages left to process.

Processing of Job 3

Next, the job control unit 303 starts the processing of the print job name "Job 3" with a printing order of "3", written in the table 1001. The PDL analyzing unit 305 is then instructed to write the job attributes designated in the job in row [c] of a table 1002. It is then confirmed that automatic adjustment is set to "yes" for [c][4]. The job control unit 303 then instructs the page control unit 304 to start the page processing, whereupon this flow starts. In step S1201, the page control unit 304 confirms whether there are still pages to be processed. Thereafter, the processing moves to steps S1201 and S1202, but the details thereof have already been described and will therefore be skipped here.

In step S1202, the used toner color for page number "1" of "Job 3" is written as "C, M" in [a][2]. The processing then moves to step S1203. In this example, the designated colors are listed as "C, M" in [c][3] of the table 1002, and thus even if the input image includes Y and K, the print image after the RIP will have the two colors of "C" and "M". There are various methods for converting output signals from input signals, but these will not be described in detail. Thereafter, the processing moves to steps S1203, S1205, S1206, S1207, and S1201, but the details thereof have already been described and will therefore be skipped here. In step S1201, the page control unit 304 ends the processing if there are no pages left to process.

Processing of Job 4

Next, the job control unit 303 starts the processing of the print job name "Job 4" with a printing order of "4", written in the table 1001. The PDL analyzing unit 305 is then instructed to write the job attributes designated in the job in row [d] of a table 1002. It is then confirmed that automatic adjustment is set to "yes" for [d][4]. The job control unit 303 then instructs the page control unit 304 to start the page processing, whereupon this flow starts.

In step S1201, the page control unit 304 confirms whether there are still pages to be processed. Thereafter, the processing moves to steps S1201, S1202, S1203, and S1205, but the details thereof have already been described and will therefore be skipped here. In step S1205, the patch type determination unit 310 confirms [d][6] in the table 1002, and confirms the value for "patch printing in margin area". In this example, the value is "yes", and the processing therefore moves to step S1208.

In step S1208, the patch type determination unit 310 accesses [a][2] of the table 1104, and confirms the toner colors to be used. If the toner colors to be used are the four CMYK colors, the processing moves to step S1206. In other words, if there are four areas for printing patches and four CMYK color patches are to be printed, each color patch can only be printed in one location. In this case, in step S1206, control is performed for printing four CMYK color patches. The details thereof have already been described and will therefore be skipped here. The descriptions will return to step S1208.

In step S1208, the used toner color "C" is listed in [a][2] of the table 1104. In this case, the processing moves to step S1209. In step S1209, the patch type determination unit 310 accesses [d][7] to [d][10] of the table 1002, and confirms whether there are patches to be printed in the margin region. If there is no indication of a patch to be printed in the margin region, the processing moves to step S1207. In other words, the operation is the same as when a patch is not printed in the margin region. In step S1209, if there is a patch to be printed in the margin region, the patch color and the priority order are read out and recorded in the RAM 2203. In this example, "C", "M", and "Y" are recorded in the RAM 2203 in order from the color highest in the priority order. The processing then moves to step S1210.

In step S1210, the patch type determination unit 310 accesses [a][2] of the table 1104, and confirms that the number of used toner colors is "1". Then, the number of used toner colors (1) is subtracted from the number of areas where patches can be printed (4), the number of margin areas where patches of the same color can be printed being "3" is recorded in the RAM 2203, and the processing moves to step S1211. In step S1211, the patch type determination unit 310 accesses the RAM 2203 and extracts the toner color for which a priority order is designated and that is used on the page. In this example, the toner colors for which a priority order designation is made are "C", "M", and "Y", and the toner color to be used on the page is only "C". Accordingly, only "C" is set as the patch color to be printed in a plurality of locations, and is written into the RAM 2203. The processing then moves to step S1212.

In step S1212, the patch type determination unit 310 accesses the RAM 2203, and confirms the toner colors to be used and the patch colors to be printed in a plurality of locations. In this example, the toner color to be used is "C", and the patch color to be printed in a plurality of locations is "C" as well. If the toner used is one color and patches of that color are to be laid out in a plurality of locations, the patches can be laid out in four locations where patches can be printed. In this case, "C4" is entered in [a][3] to [a][6] of the table 1104 so that the patches having 40 levels of density, indicated in FIGS. 8G1 to 8G3, are printed for 810, 830, 840, and 850. The processing then moves to step S1201.

In step S1201, there are still pages to be processed, and thus the page control unit 304 moves the processing to step S1202. Thereafter, the processing moves to steps S1202, S1203, S1205, S1208, S1209, and S1210, but these have already been described and will therefore be skipped here. In step S1210, the patch type determination unit 310 accesses [b][2] of the table 1104, and confirms that the number of used toner colors is "2". Then, the number of used toner colors (2) is subtracted from the number of areas where patches can be printed (4), the number of margin areas where patches of the same color can be printed being "2" is recorded in the RAM 2203, and the processing moves to step S1211.

In step S1211, the patch type determination unit 310 accesses the RAM 2203 and extracts the toner color for which a priority order is designated and that is used on the page. In this example, the toner colors for which a priority order designation is made are "C", "M", and "Y", and the toner colors to be used on the page are the two colors of "C" and "M". Accordingly, "C" and "M" are set as the patch colors to be printed in a plurality of locations, and are written into the RAM 2203. The processing then moves to step S1212.

In step S1212, the patch type determination unit 310 accesses the RAM 2203, and confirms the toner colors to be used and the patch colors to be printed in a plurality of locations. In this example, the toner colors to be used are "C" and "M", and the patch colors to be printed in a plurality of locations are "C" and "M" as well. If the toner used is two colors and patches of those colors are to be laid out in two margin locations, each patch can be laid out in one location each. In other words, both "C" and "M" can be printed in two locations, namely the default location and one additional location. In this case, the patches with 20 levels of density, indicated in FIGS. 8E1 to 8E3, are selected. To be more specific, "C2" and "M2" are entered in [b][3] and [b][6], respectively, so that "C" is printed in area 1 (810) in which "C" is the default and "M" is printed in area 4 (850) in which "M" is the default. "C2" and "M2" are entered in [b][4] and [b][5], respectively, of the table 1104 so that these patches are also is printed in area 2 (830) and area 3 (840), which are defined for "Y" and "K" by default. The processing then moves to step S1201.

In step S1201, there are still pages to be processed, and thus the page control unit 304 moves the processing to step S1202. Thereafter, the processing moves to steps S1202, S1203, S1205, S1208, S1209, and S1210, but these have already been described and will therefore be skipped here. In step S1210, the patch type determination unit 310 accesses [c] [2] of the table 1104, and confirms that the number of used toner colors is "3". Then, the number of used toner colors (3) is subtracted from the number of areas where patches can be printed (4), the number of margin areas where patches of the same color can be printed being "1" is recorded in the RAM 2203, and the processing moves to step S1211.

In step S1211, the patch type determination unit 310 accesses the RAM 2203 and extracts the toner color for which a priority order is designated and that is used on the page. In this example, the toner colors for which a priority order designation is made are "C", "M", and "Y", and the toner colors to be used on the page are the three colors of "C", "M", and "Y", from the color highest in the priority order. Here, because the number of margin areas where patches of the same color can be printed is "1", only "C", which is highest in the priority order, is set as the patch color to be printed in a plurality of locations, and is written into the RAM 2203. The processing then moves to step S1212.

In step S1212, the patch type determination unit 310 accesses the RAM 2203, and confirms the toner colors to be used and the patch colors to be printed in a plurality of locations. In this example, the toner colors to be used are "C", "M", and "Y", and the patch color to be printed in a plurality of locations is "C". In this case, "C" can be laid out in two locations, and thus the patch having 20 levels of density, indicated in FIG. 8C, is selected. Additionally, "M" and "Y" can be laid out in one location, and thus the patches having 10 levels of density, indicated in FIG. 8C, are selected. More specifically, "C2" is entered in [c][3] and [c][5] of the table 1104 so that "C" is laid out in area 1 (810), where "C" is printed by default, and "K", which is not used on this page, is laid out in the area defined by default. Additionally, "Y" and "M" are entered as "Y1" in [c][4] and "M1" in [c][6] of the table 1104 so as to be printed in area 1 (830) and area 4 (850), for which those colors are defined by default. The processing then moves to step S1201. In step S1201, the page control unit 304 ends the processing if there are no pages left to process.

Processing of Job 5

Next, the job control unit 303 starts the processing of the print job name "Job 5" with a printing order of "5", written in the table 1001. The PDL analyzing unit 305 is then instructed to write the job attributes designated in the job in row [e] of a table 1002. It is then confirmed that automatic adjustment is set to "yes" for [e][4]. Then, the job control unit 303 instructs the page control unit 304 to start page processing, and in step S1201, the page control unit 304 confirms whether there are any pages left to be processed. Thereafter, the processing moves to steps S1201, S1202, S1203, S1205, S1208, and S1209, but the details thereof have already been described and will therefore be skipped here.

In step S1209, if there is a patch to be printed in the margin region, the patch color and the priority order are read out and recorded in the RAM 2203. In this example, "C" is recorded in the RAM 2203 as the color highest in the priority order. The processing then moves to step S1210. In step S1210, the patch type determination unit 310 accesses [a][2] of the table 1105, and confirms that the number of used toner colors is "2". Then, the number of used toner colors (2) is subtracted from the number of areas where patches can be printed (4), the number of margin areas where patches of the same color can be printed being "2" is recorded in the RAM 2203, and the processing moves to step S1211.

In step S1211, the patch type determination unit 310 accesses the RAM 2203 and extracts the toner color for which a priority order is designated and that is used on the page. In this example, the toner color for which a priority order designation is made is "C", and the toner colors to be used on the page are "C" and "M". Accordingly, only "C" is set as the patch color to be printed in a plurality of locations, and is written into the RAM 2203. The processing then moves to step S1212.

In step S1212, the patch type determination unit 310 accesses the RAM 2203, and confirms the toner colors to be used, the patch colors to be printed in a plurality of locations, and the priority order thereof. In this example, the toner colors to be used are "C" and "M", the patch color to be printed in a plurality of locations is "C", and the priority order thereof is "1". When the toner used is two colors and patches of only "C" are to be laid out in a plurality of locations, "C" patches are laid out in one location each where "C" and "M" are defined by default, as well as in the remaining two locations. In other words, the patches are laid out so that the "C" patches are printed in three locations and the "M" patch in one location. The "M" patch is printed in a single location, and thus the 10 density levels indicated in FIG. 8C are used. This patch is entered as "M1" in [a][6] of the table 1105 so as to be printed in area 4 (850), for which "M" is defined by default. Additionally, the "C" patch is printed in three locations, and thus the 30 density levels indicated in FIGS. 8F1 to 8F3 are used. This patch indicates that "C" is to be printed in area 1 (810), where "C" is defined as the default, as well as area 2 (830) and area 3 (840), where "Y" and "K", which are not used in this page, are defined as the default colors. Specifically, "C3" is entered in all of [a][3], [a][4], and [a][5] of table 1105. The processing then moves to step S1201. In step S1201, the page control unit 304 ends the processing if there are no pages left to process.

Processing of Job 6

Next, the job control unit 303 starts the processing of the print job name "Job 6" with a printing order of "6", written in the table 1001. The PDL analyzing unit 305 is then instructed to write the job attributes designated in the job in row [f] of the table 1002. It is then confirmed that automatic adjustment is set to "yes" for [f][4]. The job control unit 303 then instructs the page control unit 304 to start the page processing, whereupon this flow starts.

In step S1201, the page control unit 304 confirms whether there are still pages to be processed. Thereafter, the processing moves to steps S1201, S1202, S1203, S1205, S1208, and S1209, but the details thereof have already been described and will therefore be skipped here. In step S1209, if there is a patch to be printed in the margin region, the patch color and the priority order are read out and recorded in the RAM 2203. In this example, "C" is recorded in the RAM 2203 as the color highest in the priority order. The processing then moves to step S1210.

In step S1210, the patch type determination unit 310 accesses [a][2] of a table 1106, and confirms that the number of used toner colors is "1". Then, the number of used toner colors (1) is subtracted from the number of areas where patches can be printed (4), the number of margin areas where patches of the same color can be printed being "3" is recorded in the RAM 2203, and the processing moves to step S1211. In step S1211, the patch type determination unit 310 accesses the RAM 2203 and extracts the toner color for which a priority order is designated and that is used on the page. In this example, the toner color for which a priority order designation is made is only "C", and the toner color to be used on the page is only "C" as well. Accordingly, only "C" is set as the patch color to be printed in a plurality of locations, and is written into the RAM 2203. The processing then moves to step S1212.

In step S1212, the patch type determination unit 310 accesses the RAM 2203, and confirms the toner colors to be used, the patch colors to be printed in a plurality of locations, and the priority order thereof. In this example, the toner color to be used is "C", the patch color to be printed in a plurality of locations is "C", and the priority order thereof is "1". When the toner used is one color and patches of only "C" are to be laid out in a plurality of locations, "C" patches are laid out in one location where "C" is defined as a default as well as the remaining three locations. In other words, the patches are laid out so that the "C" patches are printed in four locations. The "C" patch is printed in four locations, and thus the 40 density levels indicated in FIGS. 8G1 to 8G3 are used. This patch indicates that "C" is to be printed in area 1 (810), where "C" is defined as the default, as well as the areas where "Y", "K", and "M", which are not used in this page, are defined as the default colors. In other words, "C4" is entered in [a][3], [a][4], [a][5], and [a][6] of the table 1106 so as to be printed in area 2 (830), area 3 (840), and area 4 (850). The processing then moves to step S1201. In step S1201, the page control unit 304 ends the processing if there are no pages left to process.

Processing of Job 7

Next, the job control unit 303 starts the processing of the print job name "Job 7" with a printing order of "7", written in the table 1001. The PDL analyzing unit 305 is then instructed to write the job attributes designated in the job in row [g] of the table 1002. It is then confirmed that automatic adjustment is set to "yes" for [g][4]. The job control unit 303 then instructs the page control unit 304 to start the page processing, whereupon this flow starts. In step S1201, the page control unit 304 confirms whether there are still pages to be processed. Thereafter, the processing moves to steps S1201, S1202, S1203, S1205, S1208, and S1209, but the details thereof have already been described and will therefore be skipped here.

In step S1209, if there is a patch to be printed in the margin region, the patch color and the priority order are read out and recorded in the RAM 2203. In this example, "K" is recorded in the RAM 2203 as the color highest in the priority order. The processing then moves to step S1210. In step S1210, the patch type determination unit 310 accesses [a][2] of the table 1107, and confirms that the number of used toner colors is "1". Then, the number of used toner colors (1) is subtracted from the number of areas where patches can be printed (4), the number of margin areas where patches of the same color can be printed being "3" is recorded in the RAM 2203, and the processing moves to step S1211.

In step S1211, the patch type determination unit 310 accesses the RAM 2203 and extracts the toner color for which a priority order is designated and that is used on the page. In this example, the toner color for which a priority order designation is made is only "K", and the toner color to be used on the page is only "K" as well. Accordingly, only "K" is set as the patch color to be printed in a plurality of locations, and is written into the RAM 2203. The processing then moves to step S1212.

In step S1212, the patch type determination unit 310 accesses the RAM 2203, and confirms the toner colors to be used, the patch colors to be printed in a plurality of locations, and the priority order thereof. In this example, the toner color to be used is "K", the patch color to be printed in a plurality of locations is "K", and the priority order thereof is "1". When the toner used is one color and patches of only "K" are to be laid out in a plurality of locations, "K" patches are laid out in one location where "K" is defined as a default as well as the remaining three locations. In other words, the patches are laid out so that the "K" patches are printed in four locations. The "K" patch is printed in four locations, and thus the 40 density levels indicated in FIGS. 8G1 to 8G3 are used. This patch indicates that "K" is to be printed in area 1 (840), where "K" is defined as the default, as well as the areas where "C", "Y", and "M", which are not used in this page, are defined as the default colors. In other words, "K4" is entered in [a][3], [a][4], [a][5], and [a][6] of the table 1106 so as to be printed in area 1 (810), area 2 (830), and area 4 (850). The processing then moves to step S1201. In step S1201, the page control unit 304 ends the processing if there are no pages left to process.

As described above, when the patch type is determined in the image processing apparatus 101, the patch type determination unit 310 included in the image processing apparatus 101 handles that role.

Patch Determination by Image Processing Apparatus 101

Although a case where the patch type determination is performed by the image processing apparatus 101 was described earlier, if the patch type determination is performed by the image forming apparatus 103, the patch type determination unit 337 handles that role. In that case, the information necessary for determining the patch type is received from the image processing apparatus 101, after which the patch type is determined. The method for determining the patch type is the same as that described in the case where the patch determination is performed by the image processing apparatus 101, and will therefore not be described in detail here.

According to the present embodiment, the color of a tone patch for tone correction, which is composited with an image on a page-by-page basis, is determined according to the color components used on that page, and a tone patch of the determined color is composited with the image. The image is then subjected to tone correction on the basis of the tone correction information, the image is formed, the colors in the tone patch formed on the medium are measured, and the tone correction information is updated on the basis of the measured values. This makes it possible to composite a tone patch according to color management information specified by the owner of the print job, and to achieve precise color management. Furthermore, tone patches having a greater number of tones can be composited using leftover regions for tone patches, which makes it possible to achieve even more precise color management.

Second Embodiment

The first embodiment described a method of checking the toner colors used from an image obtained through raster image expansion on a page, and laying out the adjustment patches using only the toner colors used on that page. However, depending on the image forming apparatus, it may not be possible to set whether or not to print each of the four CMYK patches, switch the printing positions, and so on on a page-by-page basis. In this case, if, for example, the color mode is set to "grayscale" in the job settings and "print adjustment marks in paper margin" through automatic adjustment is designated, all CMYK color patches will be printed in the margins of the grayscale image. This makes it impossible for the printing system to manage the number of colors on a page-by-page basis. The present embodiment will describe a method in which, to manage the number of colors per page in the printing system, a combination of job settings which make it impossible to manage the number of colors per page is detected in the printing system, and the user is warned of such a combination.

Figure 13A:
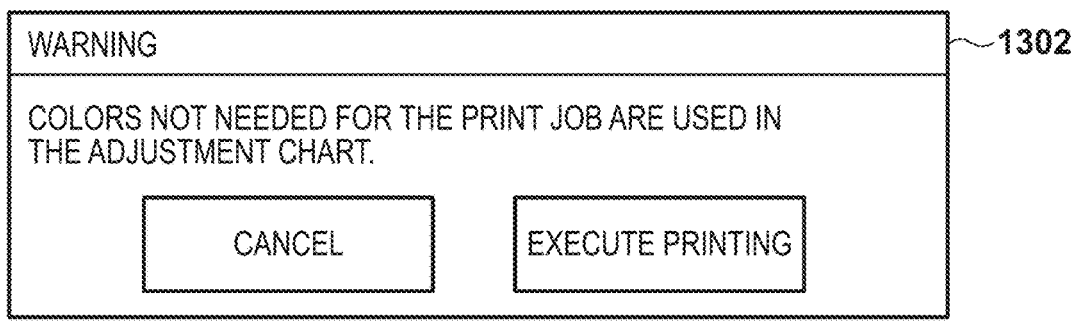
FIG. 13A illustrates an example of a warning screen.
Figure 13B:
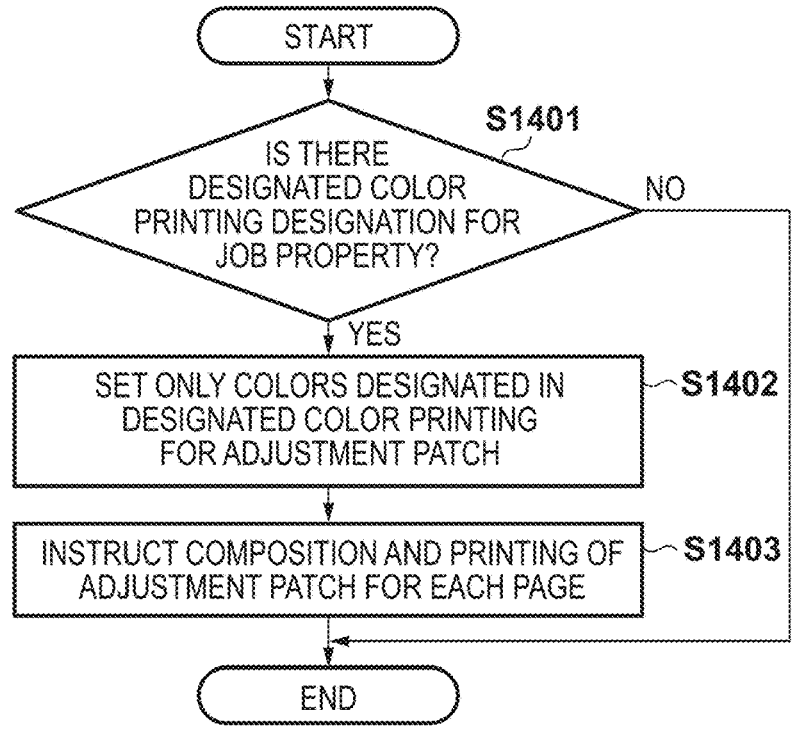
FIG. 13B illustrates an example of a warning screen.

A UI constraints table 1301 illustrated in FIG. 13A is a table for determining whether to allow the simultaneous designation of two different job settings. In this example, column [1] indicates the color mode "CMYK" in the job settings. Column [2] indicates the color mode "grayscale" in the job settings. Row [a] indicates automatic adjustment (real-time correction) in the job settings. Whether or not each combination of row and column settings is allowed is recorded. FIG. 13B illustrates an example of a warning screen in which a combination of settings that is not allowed has been designated.

The UI constraints table 1301 and a screen 1302 are stored in the ROM 2202, and are read out and used by the CPU 2201. As already described in detail with reference to FIG. 9, the user operates the operation unit 2206, selects a job, and displays the UI 900 in the operation unit 2206. The user operates the operation unit 2206 and selects grayscale 903 in the color mode. Then, "print adjustment marks in paper margin" 910 is designated in the patch setting part 909 and the OK button 919 is pressed, the CPU 2201 accesses the table 1301 and confirms whether the combination of these settings is allowed. In the case of this example, an "X" mark is written for the combination of the color mode "grayscale" and automatic adjustment in the UI constraints table 1301. The "X" mark indicates that this combination of settings is not allowed.

Upon referring to the UI constraints table 1301 and determining that settings which are not allowed are active, the CPU 2201 obtains the warning screen 1302 from the RAM 2203 and instructs the UI control unit 308 to display the warning screen in the operation unit 2206. The user can select whether to execute the printing as-is or cancel the printing and redo the job settings after viewing the warning screen 1302 displayed in the operation unit 2206.

In addition, although the screen illustrated in FIG. 9 is held by the image processing apparatus 101 and displayed in the operation unit 2206 thereof to enable users to make job settings, job settings can also be made by a utility that performs job settings, i.e., what is known as a print driver. In this case, for example, the print driver is run by the information processing apparatus 102, and the warning screen can be displayed on the basis of the job settings and the combination of job settings described in this example.

According to the present embodiment, the user can be warned of settings that disable color management when using an image forming apparatus in which whether to print each of the four CMYK color patches on a page-by-page basis, switching the printing position, and so on are not possible.

Third Embodiment

Figure 14:
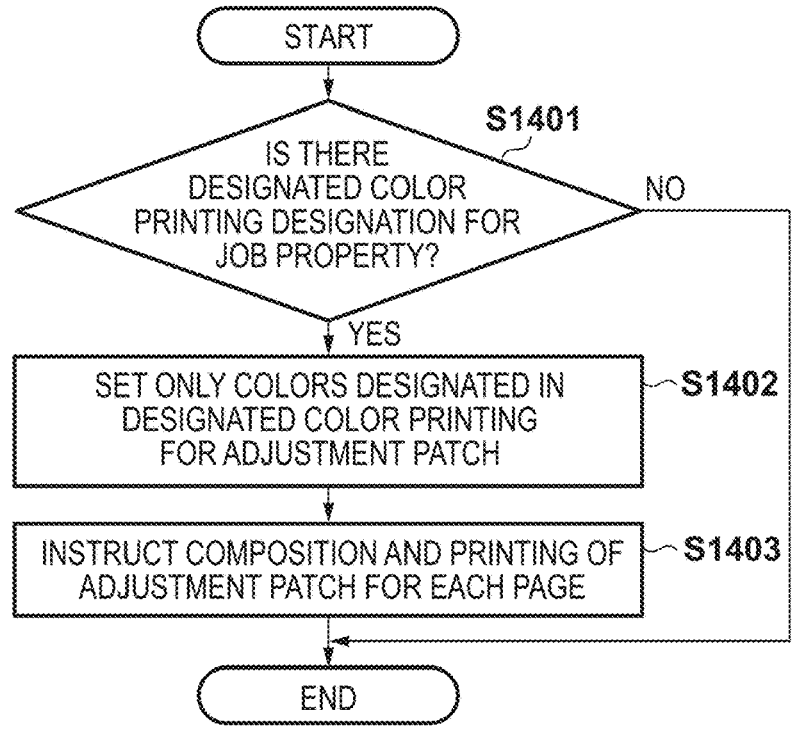
FIG. 14 is a flowchart for printing instructions specifying only colors designated in designated color printing for an adjustment patch.

FIG. 14 is a flowchart for printing instructions specifying only colors designated in designated color printing for an adjustment patch. Each step in the flowchart illustrated in FIG. 14 is realized by the CPU 2201 reading out a program stored in the ROM 2202. This processing is executed by the job control unit 303 when the print job generating unit 301 has registered a print job.

The job control unit 303 starts this flow when automatic adjustment is set to "yes" in the job attribute table 1002. In step S1401, the job control unit 303 accesses the designated color column of the job of interest in the job attribute table 1002, and refers to the designated color. The processing ends if there is no designated color.

If there is a designated color, in step S1402, the job control unit 303 notifies the patch type determination unit 310 of the designated color. In response to this notification, the patch type determination unit 310 determines the adjustment patch of the designated color designated in designated color printing, and notifies the job control unit 303. Then, starting from the first page of the job, the page control unit 304 is instructed to start processing the page of interest. In step S1403, the page control unit 304 instructs the RIP control unit 306 to perform raster image expansion for the page of interest, and receives a result thereof. After that, a printing instruction is made, and the sequence may be the same as S4010 and on in FIG. 4A-1.

Specific Example

A specific example of the above-described processing will be described next. "Job 3" recorded in row [c] in the job attribute table 1002 of FIG. 10B will be described here as an example. Although the descriptions will be simplified, the processing still follows the procedure described above.

The job control unit 303 instructs the PDL analyzing unit 305 to write the job attributes designated in the print job in row [c] of a table 1002. Then, this flow starts when the job control unit 303 confirms that "yes" is set for automatic adjustment is [c][4]. In step S1401, the job control unit 303 accesses [c][3] of the table 1002 and confirms whether designated color printing is designated. If not, the processing ends. In this example, printing in two colors, i.e., "C" and "M", is designated in [c][3]. In this case, the processing moves to step S1402.

In step S1402, the job control unit 303 notifies the patch type determination unit 310 of the designated color printing and the color types "C" and "M" which are designated. In response to this notification, the patch type determination unit 310 determines the adjustment patches only for "C" and "M" designated in designated color printing, and notifies the job control unit 303. The processing then moves to step S1403. In step S1403, the job control unit 303 instructs the RIP control unit 306 to perform the RIP, and upon receiving the result, instructs the image generating unit 307 to composite the "C" and "M" patches with the post-RIP image and print the image. The patch compositing unit 309 then composites the "C" and "M" images with the post-RIP image. The processing then moves to step S1404. In step S1404, the patch compositing unit 309 sends the printing instructions for the patch-composited image to the printing control data sending/receiving unit 311, and the processing ends.

According to the present embodiment, the tone patches of the colors specified for each job are composited on each page, and thus the process of determining tone patches for each page can be eliminated. In addition, because tone patches of the color specified for each job are composited on each page, a situation where the range of colors used is expanded unnecessarily can be avoided, and color management can be performed precisely.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-183810, filed Nov. 2, 2020 which is hereby incorporated by reference herein in its entirety.

What is claimed is:

1. An image forming apparatus comprising one or more processors and one or more memory comprising one or more programs, wherein the one or more programs are configured to cause the one or more processors to:
   determine at least one color of at least one tone patch for tone correction, to be composited with an image, in accordance with at least one color component used in the image;
   generate a patch-included image by compositing the tone patch of the color determined with the image;
   generate a corrected image by performing tone correction on the patch-included image on the basis of tone correction information for each color component;
   form the corrected image on a medium; and
   perform color measurement of the tone patch formed on the medium and update the tone correction information on the basis of a value measured, wherein
   a region or plural regions where the tone patch is composited is/are set in the image in advance,
   in a case where there is at least one available region, and the tone patch is set to be composited in a margin region, the tone patch of the color determined in the determining is composited in the margin region,
   in the determining it is selectable whether to print tone patches of cyan, magenta, yellow and black on a page, or to print one or more tone patches of prioritized ones of cyan, magenta, yellow and black on the page, and
   in a case where it is selected to print one or more tone patches of prioritized ones of cyan, magenta, yellow and black, the color of the tone patch composited in the margin region is determined according to a priority order set for each color.

2. The image forming apparatus according to claim 1, wherein the image is a page image included in a print job received, and
the determining includes determining a color used for each page as the color of the tone patch.

3. The image forming apparatus according to claim 1, wherein the image is a page image included in a print job received, and
when the print job includes a setting for a designated color, the determining includes determining the designated color as the color of the tone patch.

4. The image forming apparatus according to claim 1, wherein the tone patch of the color composited in the margin region has a number of tones based on a number of the margin regions.

5. The image forming apparatus according to claim 1, wherein when there is at least one available region, and the tone patch is not set to be composited in the margin region, the tone patch is not composited in the margin region.

6. The image forming apparatus according to claim 1, wherein when the tone patch of a predetermined color is set to be composited on all pages, the tone patch of the predetermined color is composited on all pages.

7. The image forming apparatus according to claim 1, wherein the tone correction information is held for each of types of the medium, and
the correcting includes performing tone correction on the basis of the tone correction information held for each of the types of the medium.

8. The image forming apparatus according to claim 1, wherein the determining includes determining the color component, among cyan, magenta, yellow, and black, that is used in the image, as the color of the tone patch.

9. An image forming method performed by an image forming apparatus including an image forming unit, the method comprising:
   determining at least one color of at least one tone patch for tone correction, to be composited with an image, in accordance with at least one color component used in the image;
   generating a patch-included image by compositing the tone patch of the color determined with the image;
   generating a corrected image by performing tone correction on the patch-included image on the basis of tone correction information for each color component;
   the image forming unit forming the corrected image on a medium; and
   performing color measurement of the tone patch formed on the medium and updating the tone correction information on the basis of a value measured, wherein
   a region or plural regions where the tone patch is composited is/are set in the image in advance,
   in a case where there is at least one available region, and the tone patch is set to be composited in a margin region, the tone patch of the color determined in the determining is composited in the margin region, in the determining it is selectable whether to print tone patches of cyan, magenta, yellow and black on a page, or to print one or more tone patches of prioritized ones of cyan, magenta, yellow and black on the page, and in a case where it is selected to print one or more tone patches of prioritized ones of cyan, magenta, yellow and black, the color of the tone patch composited in the margin region is determined according to a priority order set for each color.

* * * * *